United States Patent [19]
Dobbins et al.

[11] Patent Number: 6,147,995
[45] Date of Patent: *Nov. 14, 2000

[54] METHOD FOR ESTABLISHING RESTRICTED BROADCAST GROUPS IN A SWITCHED NETWORK

[75] Inventors: Kurt Dobbins, Bedford; Phil Andlauer, Londonderry; Michael Skubisz, Durham, all of N.H.

[73] Assignee: Cabletron Systems, Inc., Rochester, N.H.

[*] Notice: This patent is subject to a terminal disclaimer.

[21] Appl. No.: 09/387,317

[22] Filed: Aug. 31, 1999

Related U.S. Application Data

[63] Continuation of application No. 08/960,919, Oct. 30, 1997, Pat. No. 5,946,308, which is a continuation of application No. 08/559,738, Nov. 15, 1995, Pat. No. 5,684,800.

[51] Int. Cl.[7] .............................. H04L 12/28; H04L 12/56
[52] U.S. Cl. ............................................. 370/392; 370/400
[58] Field of Search ...................................... 370/392, 390, 370/396, 389, 400, 401, 402, 403, 404, 432, 469, 474, 386, 388, 395, 397, 398, 399, 405, 406, 409, 420, 422, 437

[56] References Cited

U.S. PATENT DOCUMENTS

| | | | |
|---|---|---|---|
| 4,823,338 | 4/1989 | Chan et al. ............................ | 370/85.1 |
| 5,140,585 | 8/1992 | Tomikawa .............................. | 370/60.1 |
| 5,208,811 | 5/1993 | Kashio et al. .......................... | 370/94.1 |
| 5,394,402 | 2/1995 | Ross ....................................... | 370/402 |
| 5,444,702 | 8/1995 | Burnett et al. .......................... | 370/254 |
| 5,485,455 | 1/1996 | Dobbins et al. ......................... | 370/60 |
| 5,684,800 | 11/1997 | Dobbins et al. ......................... | 370/401 |
| 5,740,171 | 4/1998 | Mazzola et al. ......................... | 370/401 |

(List continued on next page.)

FOREIGN PATENT DOCUMENTS

WO 95/01023  5/1995  WIPO .
WO 95/04420  9/1995  WIPO .

OTHER PUBLICATIONS

Cheriton, David R. et al., "Host Groups: A Multicast Extension For Datagram Internetworks", *Computer Systems Laboratory Stanford University*, pp. 172–179, 1985.

Paliwoda, K. "Transactions Involving Multicast", *Computer Communications*, vol. 11, pp. 313–318, Dec. 11, 1988.

Truong, Hong Linh, "LAN Emulation on an ATM Network", *IEEE Communications Magazine*, pp. 70–85, May 1995.

Lin, Tzung–Pao, "A Platform For Seamless Interworking Among Conventional LANs and ATM Networks", *IEEE Communications*, pp. 296–301, Nov. 28, 1994.

Biagioni, Edoardo, "Designing a Practical ATM LAN", *IEEE Network*, pp. 32–39, Mar. 1993.

Catania, Vincenzo et al., "A Routing Strategy For Man Interconnection", *IEEE Communications Magazine*, pp. 608–615, 1991.

Newman, Peter, "ATM Local Area Network", *IEEE Communications Magazine*, pp. 86–98, Mar. 1994.

Asoh, J. et al. "Virtual LAN Realization on an ATM Connectionless Public Network", 2nd Asia Pacific Conference on Communications, vol. 2, pp. 516–520, Jun. 1995.

*Primary Examiner*—Dang Ton
*Assistant Examiner*—Phirin Sam
*Attorney, Agent, or Firm*—Wolf, Greenfield & Sacks, P.C.

[57] ABSTRACT

Method and apparatus for establishing restricted broadcast groups in a switched network. The method assigns different virtual LAN identifiers (VLAN-IDs) to different subsets of associated end systems or access ports. Tables are maintained for mapping the VLAN-IDs with associated end systems and access ports. When a broadcast packet is received at a first switch, it is encapsulated with a VLAN header, including the VLAN-IDs, and sent out a multicast channel to all other switches in the network (domain). The original packet is sent out the other access ports of the receiving switch for the designated VLAN-IDs. The switches receiving the VLAN packet remove the header and send the original packet out access ports associated with the VLAN-IDs extracted from the header. The method provides a mechanism for forwarding broadcast packets of a protocol not supported by the switching mechanism, as well as multicast packets and unicast packets from undiscovered end systems.

35 Claims, 11 Drawing Sheets

U.S. PATENT DOCUMENTS

| | | | |
|---|---|---|---|
| 5,742,604 | 4/1998 | Edsall et al. | 370/401 |
| 5,751,967 | 5/1998 | Raab et al. | 709/228 |
| 5,752,003 | 5/1998 | Hart | 709/223 |
| 5,818,842 | 10/1998 | Burwell et al. | 370/397 |
| 5,920,705 | 7/1999 | Lyon et al. | 709/240 |
| 5,963,556 | 10/1999 | Varghese et al. | 370/401 |
| 6,005,864 | 12/1999 | Krause | 370/395 |

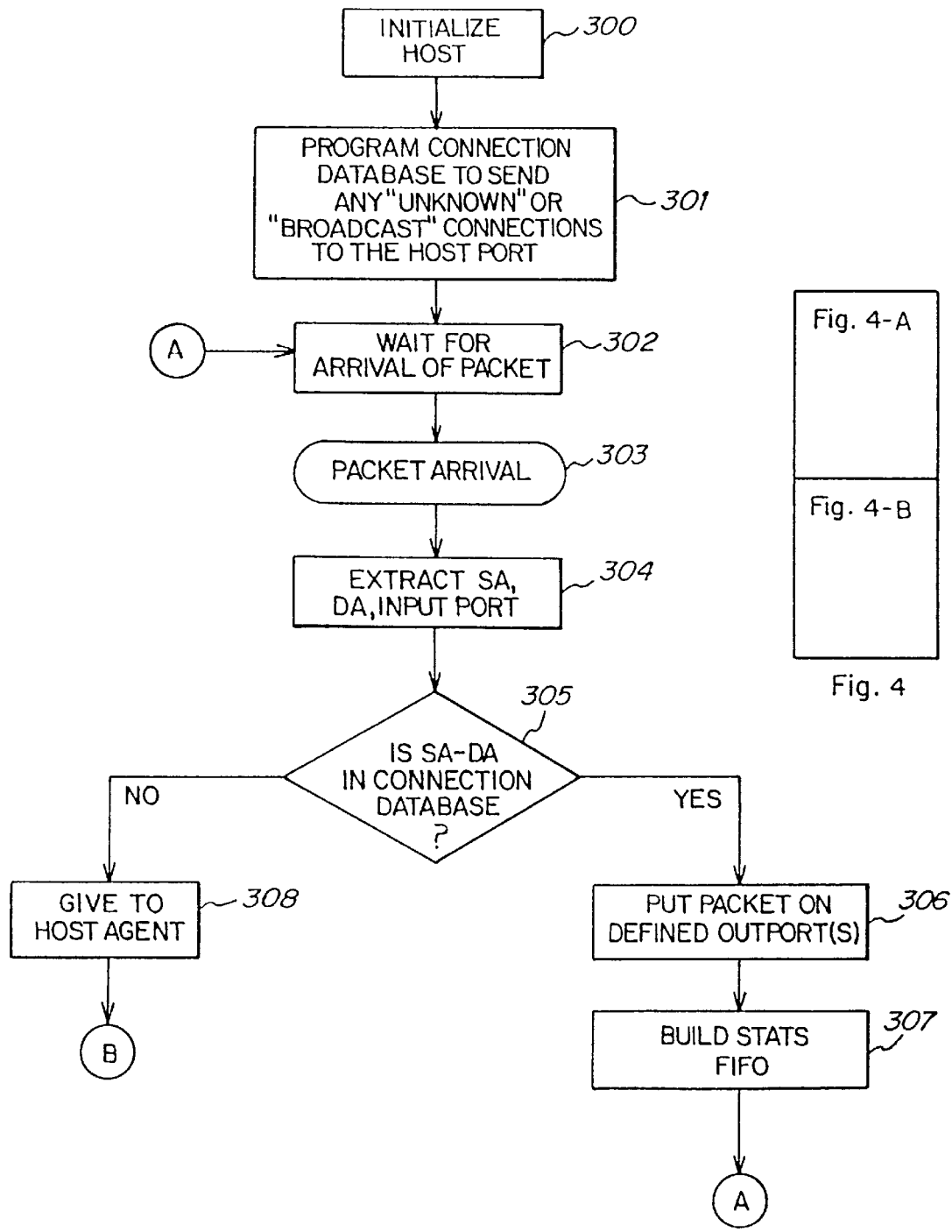
FIG. 4-A

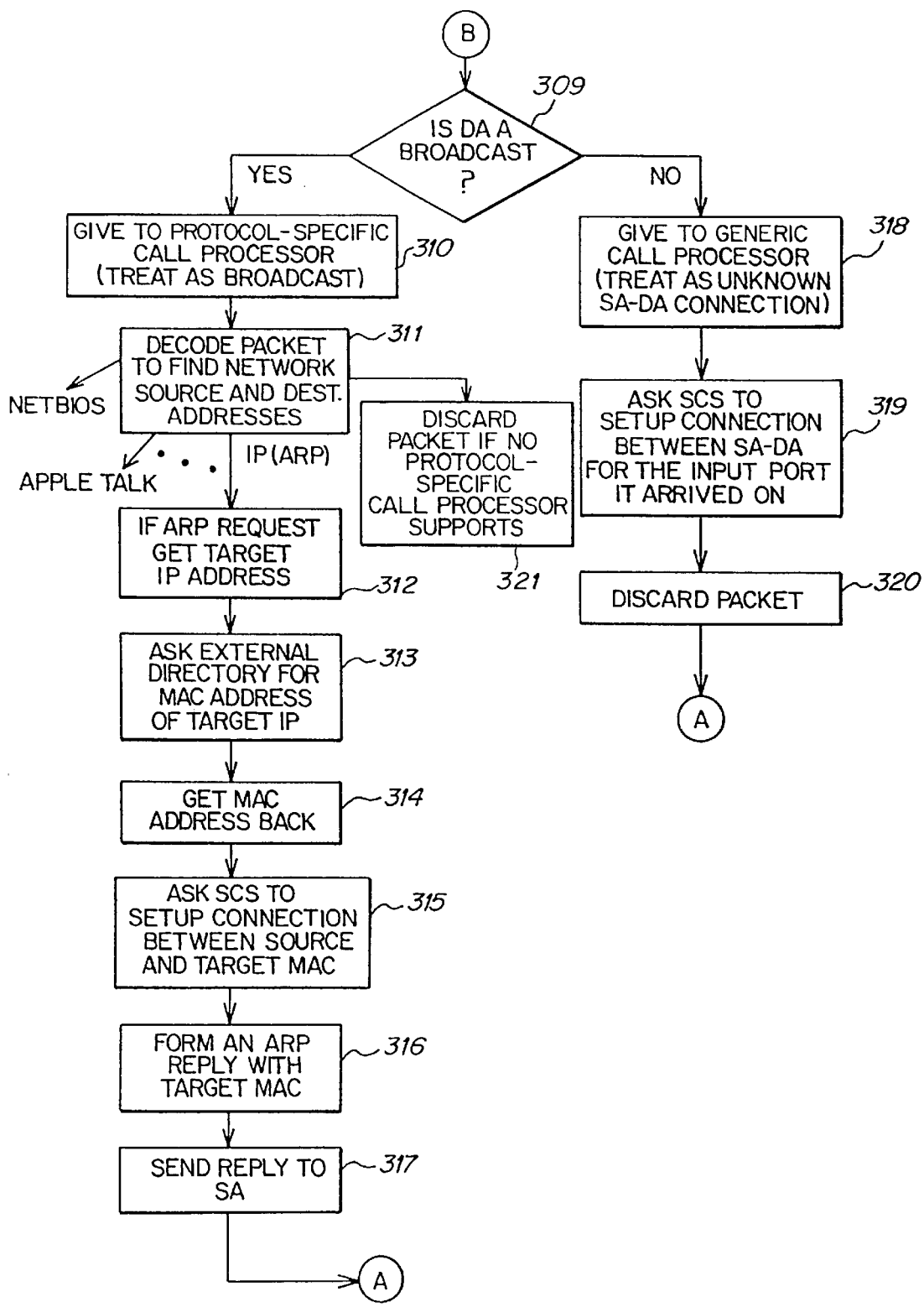
FIG. 4-B

TABLE 1: END SYSTEM/VLAN MAPPING FOR SWITCH 11

| ACCESS PORT | END SYSTEMS HEARD | VLAN ID |
|---|---|---|
| 1 | 20A | VLAN 100 |
| 2 | 20B | VLAN 100 |
|   |     | VLAN 20 |
| 3 | 20C | VLAN 20 |
| . | . | . |
| . | . | . |
| . | . | . |

TABLE 2: VLAN/ACCESS PORT MAPPING FOR SWITCH 11

| VLAN ID | ACCESS PORT |
|---|---|
| VLAN 100 | 1 |
|          | 2 |
| VLAN 20  | 2 |
|          | 3 |
| . | . |
| . | . |
| . | . |

VLAN PACKET

METHOD FOR ESTABLISHING RESTRICTED BROADCAST GROUPS IN A SWITCHED NETWORK

This application is a continuation of application Ser. No. 08/960,919 filed on Oct. 30, 1997 which issued as U.S. Pat. No. 5,946,308 on Aug. 31, 1999: which is a continuation of application Ser. No. 08/559,738 filed Nov. 15, 1995 and which issued as U.S. Pat. No. 5,684,800 on Nov. 4, 1997.

FIELD OF THE INVENTION

This invention relates to packet switched data communications networks, and more particularly to an apparatus and method for establishing restricted broadcast groups known as virtual LANs (VLANS) which provide a simple but robust mechanism that allows broadcast and/or multicast packets to be "flooded" through a switched domain and transmitted only to those users or ports defined for a particular VLAN.

RELATED APPLICATIONS

The subject matter of the above application may be advantageously combined with the subject matters of the following copending and commonly owned applications, which are hereby incorporated by reference in their entirety:

U.S. Ser. No. 08/188,238 entitled "Network Having Secure Fast Packet Switching And Guaranteed Quality Of Service," filed Jan. 28, 1994 by Kurt Dobbins et al.; and U.S. Ser. No. 08/187,856 entitled "Distributed Chassis Agent For Network Management," filed Jan. 28, 1994 by Brendan Fee et al.

BACKGROUND OF THE INVENTION

Most data communications networks today rely heavily on shared medium, packet-based LAN technologies for both access and backbone connections. These networks use bridges and routers to connect multiple LANs into global internets. An internet router must be capable of processing packets based on many different protocols, such as IP, IPX, DECNET, AppleTALK, OSI, SNA and others. The complexities of building networks capable of routing packets on the global internet using different protocols is a challenge for both vendors and users.

In U.S. Ser. No. 08/188,238 to Dobbins (see related applications above), there is described a new secure fast packet switching (SFPS) technology which provides the same or better reliability and security as routers, but with much greater performance and without an increase in cost. The SFPS system avoids the complexities and costs of providing multi-protocol routers. Also, the SFPS system provides capabilities which routers do not, such as the ability to create separate logical work group LANs on the same physical network and the ability to guarantee a quality of service (QOS) by providing dedicated switched paths through the network.

SFPS provides high performance packet switching based on physical layer addresses such as source and destination MAC IDs—the unique medium access control (MAC) address assigned to each end system by the IEEE. End-to-end connections are determined by a network management application that provides security and best path routing determinations based on a number of constraints. By switching packets based only on MAC layer information, network infrastructure remains protocol insensitive.

More specifically, SFPS uses source and destination MAC addresses which alone, or in combination with an input port on a switch, form a unique "connection identifier" for any communication exchange between designated end systems. As an example:

input port=2 source MAC address=00:00:1D:01:02:03 destination MAC address=00:00:1D:11:22:33 together form a "tuple" bound to a specific unidirectional flow from a source address to a destination address. All packets that have this tuple are automatically switched according to the operation of the SFPS.

Network infrastructures are built around a core switching fabric, which provides the physical paths or routes that allow users to send information to one another. Access to the switching fabric is gained through an access port. Access ports provide several functions—most importantly, they provide security and accounting services. End systems such as personal computers (PCs), workstations and servers connect to an access port using one or more access technologies such as Ethernet, Token Ring, FDDI, or ATM.

In traditional bridge and router devices, each packet is treated as an independent unit of data which is individually processed by application of access and security constraints, as well as path determination. In contrast, with SFPS this processing is done only on initial probe packets which are decoded, and through use of a central directory of end system constraints policy, call attributes, location, paths, quality of service, etc., the connection is either rejected or accepted. If accepted, the path is determined and switches along the path are "programmed" to allow subsequent packets on this "connection" to be switched. In either case, subsequent datagrams are either switched or discarded without having to reapply all of the security and access control and path determination logic.

The SFPS switching technology may be constructed as: software objects which exist in embedded devices as firmware; software objects which are part of an application on a commercial computer system; application specific integrated circuits (ASIC); or functionally equivalent hardware components.

It is common for internetworking devices to "route" the protocols that a device supports, and "bridge" the protocols that are not supported for routing. In addition, some protocol frames (such as DECs LAT) are actually unroutable. In SFPS switches, there are protocol-specific call processors to route protocol-specific broadcast frames (note that unicast frames can be processed by a "generic" call processor that does not decode or translate the frame at all, but instead makes the connection request based on the source and destination unicast MAC addresses in the frame). However, a problem arises in that an SFPS switch has nothing equivalent to bridging of multicast and broadcast packets for non-supported protocols. Thus, until a protocol-specific call processor is implemented in a switch, the switch must discard any broadcast or multicast frames it does not understand.

SUMMARY OF THE INVENTION

A method and apparatus are provided for establishing restricted broadcast groups within a switching fabric, known as virtual LANs (VLANs). The VLANs provide a simple but robust mechanism for allowing broadcast and multicast packets to be "flooded" through the switching fabric and transmitted only to those users or ports defined for a particular VLAN.

More specifically, the switched network includes a plurality of end systems and switches connected by links. The switches have access ports connected to end systems and network ports connected to other switches. Each end system has a unique physical layer address, e.g., MAC address. In accordance with this invention, different virtual LAN identifiers (known as VLAN-IDs) are assigned to different subsets of associated end systems or access ports. Each access switch maintains a first table for mapping VLAN-IDs to associated end systems and/or access ports (the End System/VLAN table). Each access switch also maintains a second table for mapping access ports (of associated end systems) to associated VLAN-IDs (the VLAN/Access Port table).

According to a first embodiment, the restricted V-LAN flooding is used for broadcast packets of a protocol not supported by the switches. When an original broadcast packet (of an unsupported protocol) is received by a first access switch from a first end system, the first switch determines and adds a VLAN header to the original data packet to create a VLAN packet. The VLAN header includes designated VLAN-IDs from the first table. The designated VLAN-IDs are assigned based on the physical source address of the first end system. The first access switch then forwards the VLAN packet to all other switches on a multicast channel of point-to-point connections between the switches. The first switch also forwards the original broadcast packet out the access ports identified in the second table for the designated VLANS (except the originating port).

The other switches receive the VLAN packet and extract the designated VLAN-IDs from the VLAN header and then forward the original packet out the access ports, defined in the other switch's second table, for the designated VLAN-IDs.

Other embodiments include the designation of a default VLAN-ID which maps to all access ports, a reserved VLAN-ID for use with multicast packets, and restricted flooding for packets directed to an undiscovered end system. Still another embodiment provides a single or distributed network server on the multicast channel (between switches) to handle broadcast and multicast packets, which embodiment scales better for larger networks.

More specific methods and a particular apparatus for implementing the present invention are described in the following detailed description and drawings.

BRIEF DESCRIPTION OF THE DRAWINGS

FIG. 4, combining FIGS. 4-A and 4-B, is a flowchart showing processing of a data packet by an SFPS switch.

DETAIL DESCRIPTION

The SFPS Network—Switching of Unicast Packet with Generic Call Processor and Switching of Protocol-supported Broadcast Packets According to one embodiment, the establishment of VLANs for transmitting broadcast/multicast packets of non-supported protocols is intended for use in the SFPS switched network described in U.S. Ser. No. 08/188,238. The following is a general description of the operation of switching "unicast" packets on that network, as illustrated in FIGS. 1–4.

Figure 1:
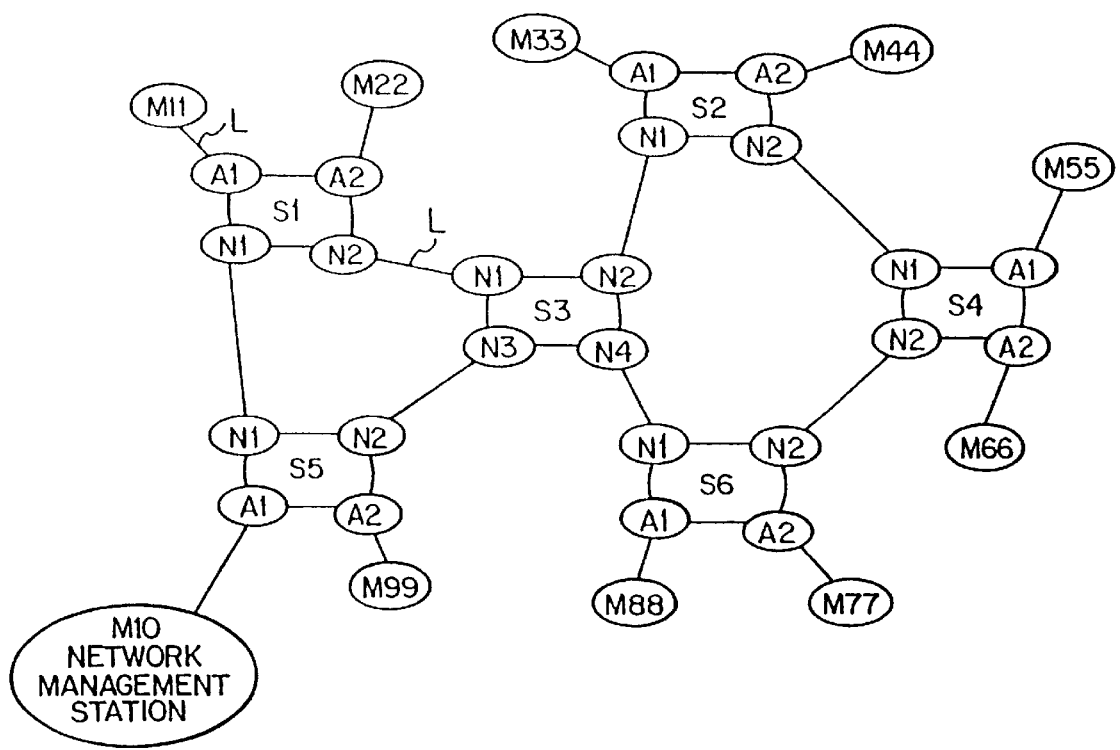
FIG. 1 is a schematic illustration of a network topology built with SFPS switches.

FIG. 1 shows a representative network topology built with six secure fast packet switches (SFPS) labeled S1–S6 connected by links L. Each switch has for example four ports; some ports are labeled A for access and some are labeled N for network. The end systems are connected to the access ports by links L and are labeled "M_". One end system is a network management station or server (NMS) M10, which includes a connection server.

Figure 2:
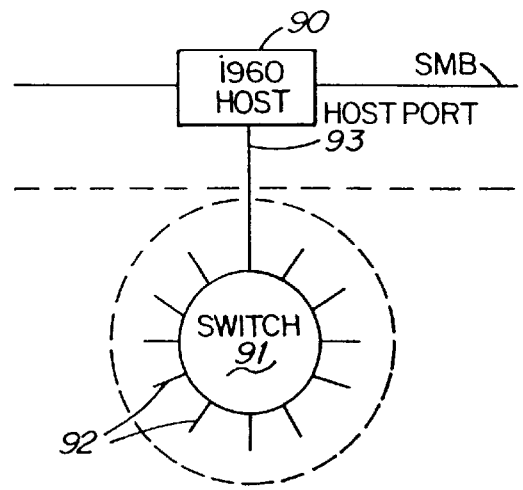
FIG. 2 is a schematic illustration of an SFPS switch.

FIG. 2 is a schematic illustration of an SFPS switch 91 having a plurality of ports 92. A host port 93 connects the switch to its host CPU 90, which may be an i960 microprocessor sold by Intel Corporation. The host CPU is connected to a system management bus (SMB) for receipt and transmission of discovery and other control messages.

Figure 3:
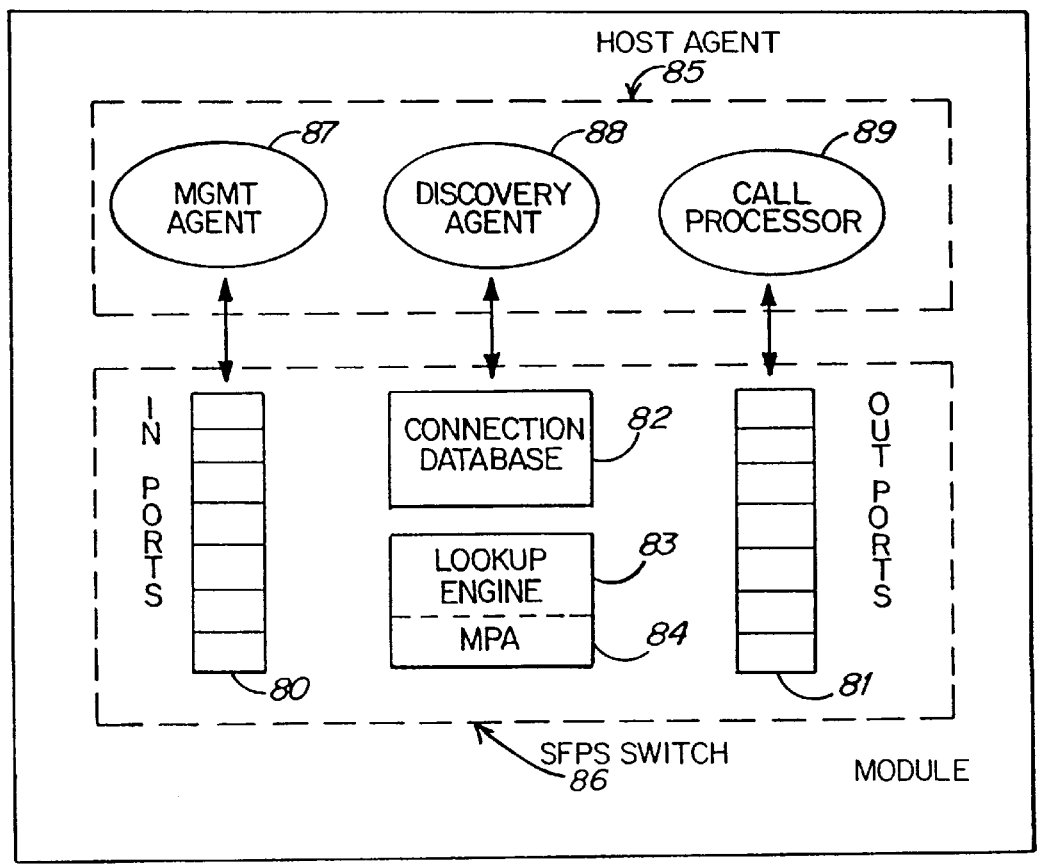
FIG. 3 is a logical view of an SFPS switch.

FIG. 3 illustrates the internal operation of the switch. The SFPS switch 86 includes in ports 80, out ports 81, a connection database 82, a look-up engine 83, and a multi-level programmable arbiter MPA 84. The switch 86 sends and receives messages from the host agent 85, which includes a management agent 87, a discovery agent 88, and a call processing agent 89.

The management agent 87 provides external control of the configuration and operation of the SFPS switch, through the network management system.

The discovery agent 88 provides a mapping of end systems to switching ports through a passive listening (snooping) capability and a registering of end system addresses and port locations of the host switch with a common external directory. Adjacent switches are also discovered and mapped, but this may be done with an explicit switch-to-switch protocol (nonpassive).

The call processor 89 provides a means for requesting connections to be established between two end systems. Unicast frames are handled by a "generic" call processor which programs the switches based on the source and destination MAC addresses. In a case where the source and destination MAC addresses are not in the packet frame, i.e., usually in a frame that has a broadcast—all hosts—MAC address, a "protocol-specific" call processor (if available) will decode the packet to find source or destination network addresses and use these to map back to the physical addresses via the external directory. Once the end system MAC addresses are known, the protocol-specific call processor will then request the connection between the end systems. If the broadcast frame was a probe or address resolution packet (i.e., an implied connection request), the call processor will return a probe reply as a "proxy" which gives the destination end system MAC addresses. Subsequently, the source end system can then send packets directly to the destination based on its MAC address.

FIG. 4 is a flow chart illustrating what happens from the time a data packet is received on an in port of the switch, until it is sent on the correct out port.

Referring to FIG. 4-A, in step 300 the host CPU 90 is initialized. The host programs the connection database 82 to send any "unknown" or "broadcast" connections to the host port (step 301). The switch then waits for a packet to arrive (step 302). Once a packet has arrived (step 303), the switch extracts the source MAC address, destination MAC address, and identifies the inbound port on which the packet was received (step 304). The look-up engine 83 checks to see whether this source-destination pair is already located in the connection database 82 (step 305). If it is not found, the packet is given to the host agent 85 (step 308). The call processor and the host agent determine whether it is a broadcast destination (step 309). If the answer is yes, a protocol-specific call processor (if available) decodes the packet to find the network protocol source and destination addresses (steps 310–311). A different protocol decode logic would be provided for each network protocol. For example, in the IP protocol, if an ARP request is received, the call processor would get the target IP address (step 312). It would then ask the external directory for the MAC address of the destination IP (step 313). In the next step 314, the directory sends the MAC destination address back to the call processor. The call processor 89 then asks the connection server (SCS) to set up a connection between the source MAC and destination MAC (step 315). The call processor 89 forms an ARP reply packet by putting the destination MAC address inside the packet (step 316), and the call processor sends a reply to the source address (step 317). It should be noted that this reply allows the source end system to update its private mapping of the destination IP address to a nonbroadcast MAC address. All subsequent packets to this destination IP address will be properly framed with the source and destination MAC address for which connections will now exist.

Note that if no call processor exists which supports the relevant protocol, the broadcast packet is dropped (step 321). The present invention is a method of handling such packets.

If the packet is not a broadcast packet, it is given to the "generic" call processor (treated as an unknown SA-DA connection—step 318), which asks the connection server to set up a connection and forward the packet (step 319); the call processor then discards the packet (step 320).

Returning to step 305, if the source and destination MAC pair are found in the connection database 82, the data packet is sent to the switch outport(s) 81 defined in the database (step 306). In next step 307, the management agent 87 collects statistics regarding transmissions through the switch and sends them to the SCS (connection server).

Figure 5:
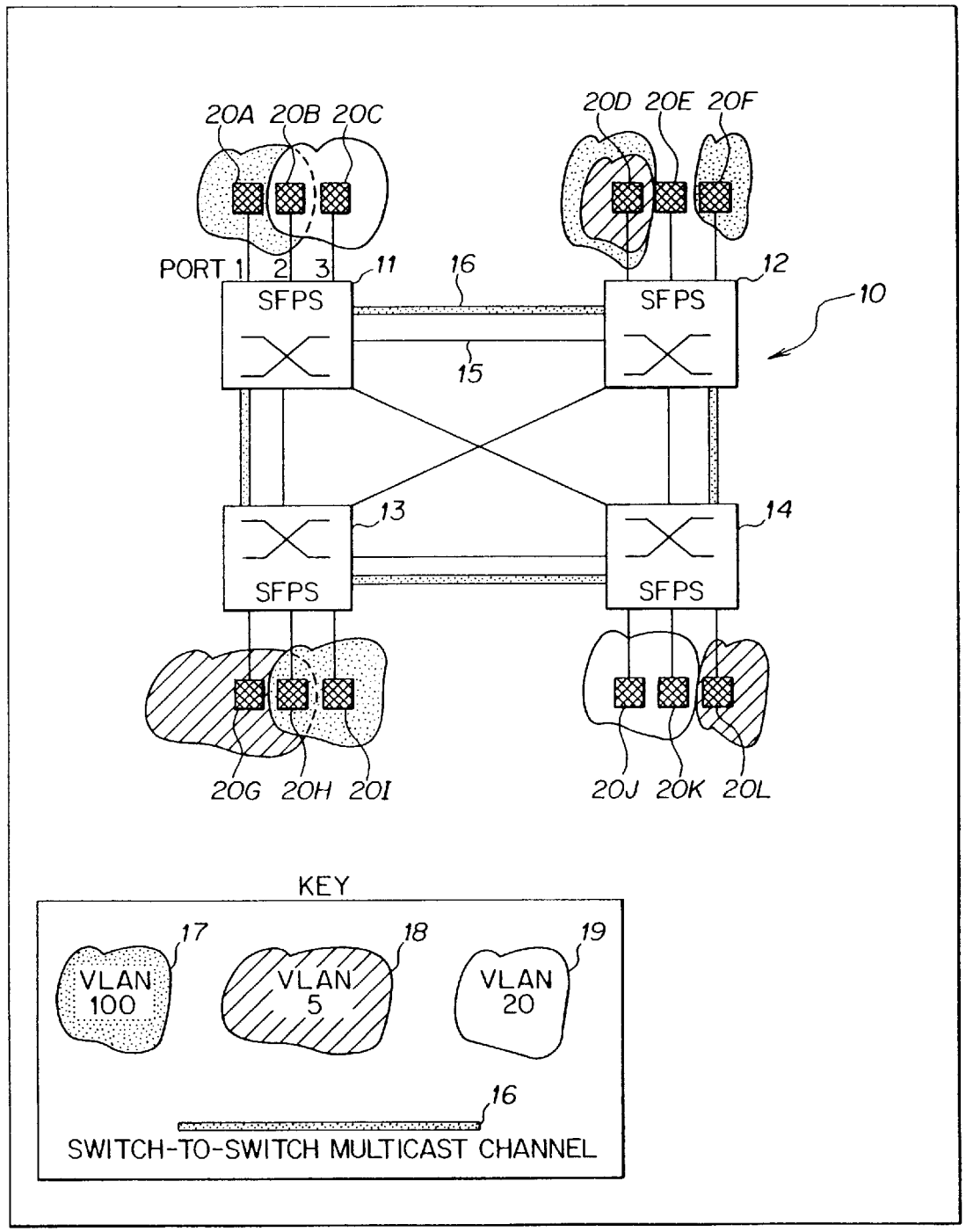
FIG. 5 is a schematic illustration of a network topology including three virtual networks (VLAN 100, VLAN 5, and VLAN 20) according to the present invention.

Restricted Broadcast Groups for Non-supported Broadcast, MultiCast and Unknown Unicast Packets FIG. 5 illustrates generally a logical view of the present invention for establishing restricted broadcast groups or virtual LANs (VLANs) within a switched network. The representative network 10 has four SFPS switches 11–14, all of the switches being connected by physical links forming point-to-point connections 15, and which physical connections together form a logical multicast channel 16. The multicast channel 16 connects the network ports of all switches. A plurality of end systems 20A–20L extend from access ports on the various switches 11–14. The end systems are shown grouped into different subsets known as virtual LANs 17, 18 and 19, which are given VLAN identifiers VLAN 100, VLAN 5, and VLAN 20, respectively. As shown 30 in FIG. 5, "VLAN 20" includes end systems 20B, 20C, 20J and 20K. "VLAN 5" includes end systems 20D, 20G, 20H and 20L. "VLAN 100" includes end systems 20A, 20B, 20D, 20F, 20H and 20I.

During a discovery time, as each switch 11–14 is discovered, it is put in a point-to-point connection that connects all SFPS switches. This forms the multicast channel 16 which all switches use between themselves.

Also during the discovery time, each switch 11–14 discovers its associated end systems (i.e., switch 11 discovers end systems 20A, 20B, 20C) and enters these end systems in a common directory which assigns VLAN-IDs to the end systems. The directory returns a mapping of VLAN-IDs and associated end systems, which mapping each switch uses to build two internal tables: a first table that lists the VLAN-ID for each end system (the End System/VLAN Table—see FIG. 6), and a second table that defines a port mask for each VLAN-ID (the VLAN/Access Port Table—see FIG. 7).

Figures 6, 7, 8:
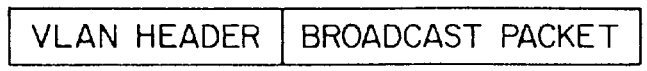
FIG. 6 shows an end system table for mapping VLAN-IDs to associated end systems.
FIG. 7 shows a port table for mapping access ports (of associated end systems) to associated VLAN-IDs.
FIG. 8 shows one embodiment of a VLAN packet, in which a VLAN header is appended to an original data packet.

During real time operation of the system, a first switch (for example switch 11) receives a broadcast or multicast packet that it cannot process with a protocol-specific call processor. The switch will encapsulate the original packet and insert a VLAN header containing a list of VLAN-IDs for the source end system (see FIG. 8), before flooding the encapsulated (VLAN) packet out the multicast channel 16 to all other switches. For example, if first switch 11 receives a broadcast packet from first end system 20B, switch 11 returns from its end system table (FIG. 6) that VLAN 100 and VLAN 20 are associated with source end system 20B. First switch 11 will insert VLAN 100 and VLAN 20 into the VLAN header (FIG. 8). In addition, first switch 11 determines the port masks for VLAN 100 and VLAN 20 from its port table (FIG. 7), and then sends the original broadcast packet out all access ports of the first switch in VLAN 100 or VLAN 20 (except for the source port 2); in this case, the original packet is sent out access port 1, which connects to end system 20A, also in VLAN 100, and out access port 3, which connects to end system 20C, also in VLAN 20.

As each of switches 12, 13 and 14 receive the VLAN packet on multicast channel 16, they strip off the encapsulated VLAN header and look up in their respective VLAN/Access Port table for any associate mapping to VLAN 100 and VLAN 20. Switch 12 determines in its port table that it has associated access ports to end systems 20D and 20F designated for VLAN 100. Similarly, switch 13 determines from its port table that it has associated access ports to end systems 20H and 20I for VLAN 100. Switch 14 determines from its port table that it has associated access ports to end systems 20J and 20K for VLAN 20. The original packet is thus transmitted out the access ports to end systems 20D, 20F, 20H, 20I, 20J and 20K.

The following describes the changes and additional functionality required of the SFPS access switches to support the establishment of VLANs for multicast and broadcast packets. Switches with only network ports continue to function as described in prior U.S. Ser. No. 08/188,238 to Dobbins et al.

The Switch-to-switch Multicast Channel

Each SFPS switch supports the multicast channel 16 by having a connection in each switch that connects it to all other switches in the network (or within a subsection of the network, such as a domain). This is in essence a point-to-multipoint connection in each switch. It should be noted that this multipoint connection is only between the switches themselves, which scales better than having a multipoint connection between all users (end systems).

A connection server (i.e., M10 in FIG. 1), which includes a common directory of all switches, has the responsibility to program the multicast channel connection each time a new switch joins or leaves the topology, i.e., such a change may be detected by neighbor advertisement signals sent by the switches.

The End System/VLAN Table (FIG. 6)

Each switch that has an access port maintains a table of end systems heard on each access port, and a list of VLANs to which each end system belongs. An end system can belong to more than one VLAN at any given time.

The assignment of VLAN-IDs may be accomplished in several ways. First, the VLAN-IDs may be maintained by a common directory. For example, as each end system is discovered by an access switch, it is registered with a common directory of end systems for the entire network, and the directory then returns a list of VLAN-IDs to the access switch with the "End System Discovery Message ACK." Alternatively, a management application may administratively assign the VLAN-IDs, and manage the end system and port tables in the switch. As a further alternative, an access switch may send a Resolve signal to a directory, which directory then returns a mapping of VLAN-IDs for an associated end system.

The VLAN/Access Port Table (FIG. 7)

Each switch having an access port maintains a port table which maps VLANs to associated access ports. This table may be filled in dynamically through the implicit mapping of VLANs to end systems. Each time a VLAN is mapped to an end system, it is automatically inserted in a port-mapping entry for the source port on which the end system is located. Ports, like end systems, can belong to more than one VLAN at any given time; the port's VLAN mapping strictly depends upon the VLAN of the end systems on it. The out ports for each VLAN entry in the table essentially define the flood mask for the access ports.

The Default VLAN-ID

Figure 9:
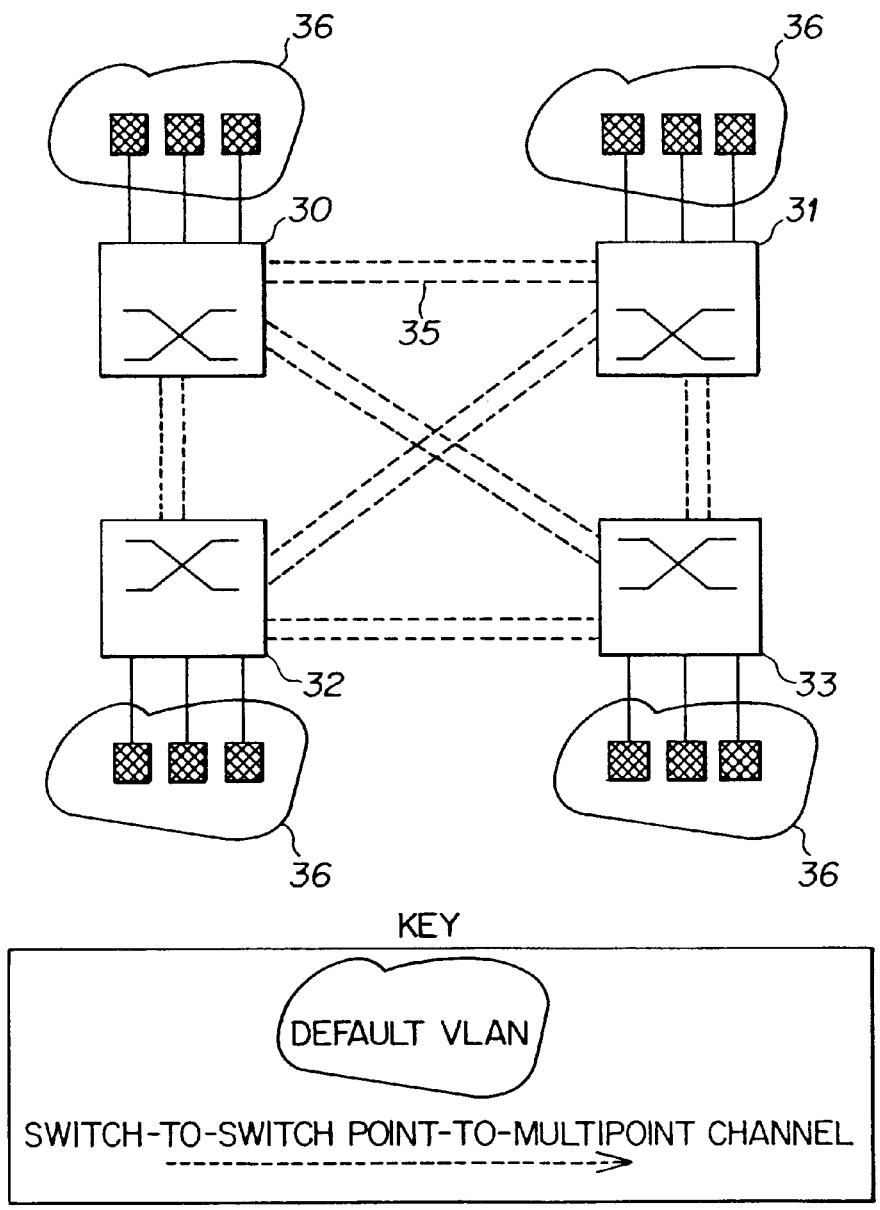
FIG. 9 is a schematic illustration of a network topology utilizing a default VLAN according to the present invention.

A default VLAN-ID (VLAN-ID=1) may be used to map an end system to a VLAN when no VLAN-ID had been administratively assigned. The default VLAN is a special case which maps to all access ports. This allows flooding out all ports when no VLAN is defined. For example, FIG. 9 illustrates a network of four switches 30, 31, 32, 33, connected by multicast channel 35, prior to assignment of any specific VLAN-IDs such that all end systems fall within a default VLAN 36.

The VLAN Call Processor

The VLAN call processor is essentially a default call processor for broadcast/multicast packets for which no protocol-specific call processor exists. For example, an ARP call processor would be able to decode an ARP broadcast message.

The VLAN call processor would take any packet it receives and then encapsulate the broadcast/multicast packet in a header, the header containing a list of VLAN-IDs on which the packet belongs. The VLAN-ID list may be determined by using the source MAC address of the original packet and doing a look-up in the end system table. In this example, VLAN-IDs are determined based on the source rather than the destination. Once this encapsulated packet is formed, it is then forwarded on the multicast channel to all other switches. The original packet would also be given to the local forwarder.

The Local Forwarder

Each switch has a process that listens on the multicast channel 16. This process is responsible for processing any encapsulated frames (VLAN packets) sent from other switches. When the VLAN packet is received, it is stripped of its VLAN-ID list in the header. For every entry in the VLAN-ID list, the local port table is searched for a matching entry. The local forwarder then forwards the original data packet out any ports that are mapped to the VLAN-ID. If the VLAN-ID is the default VLAN-ID (=1), then the original packet is flooded out all access ports on the switch. If no VLAN-IDs match, then the packet is discarded.

The Central Connection Server and Common Directory

A central connection server programs the point-to-multipoint connections between all of the SFPS switches, as there is no provision in each switch to do so (see M10 in FIG. 1). Thus, any time the connection server "discovers" a change in a switched topology, it has to reprogram the multicast channel between the switches.

The server accesses a common directory for mapping end systems to VLAN-IDs. A management application may provide this on the front end, and in addition provide for changes to the mapping in the directory itself and in any switches that have been informed of the mapping. Any end system not defined with a VLAN would default to VLAN-1.

If the VLAN assignment is done inside an End System Discovery Message ACK, then a new TLV list is added to the message. This functions similar to an "alias" field in which more than one are allowed since multiple VLANs could be returned. If the VLAN assignment is done with Resolve messages, then only a new TAG type has to be assigned since the message supports returning multiple resolutions. The semantics would be "resolve this end system to its VLAN-IDs." If the assignment was done completely out of band, then no signalling changes would be required.

Reserved VLAN-IDs

In the previous embodiment, broadcast and multicast packets are propagated through the switches based on the VLAN-IDs to which the source belongs. In some cases, mostly with multicast frames, it may be desirable to map a VLAN to the destination, e.g., OSPF packets.

This may be accomplished by allowing the switches to support "well-known" VLANs without any run-time assignment. If a switch receives a packet destined for a reserved VLAN, it would encapsulate it and set the VLAN list without mapping it to the end system table. The packet would then be forwarded out the multicast channel and any switches supporting the reserved VLAN (or having heard a reserved VLAN-type packet), would flood the original packet out.

Unicast Flooding

VLANs may be supported for unicast frames, for example if a call processor has not yet discovered the end system. This works similar to the broadcast/multicast operation except that instead of mapping the outports at each flooding switch, each switch would look up the destination unicast address in the end system table and send the original packet out the port on which the end system belongs.

VBUS Service

Figure 10:
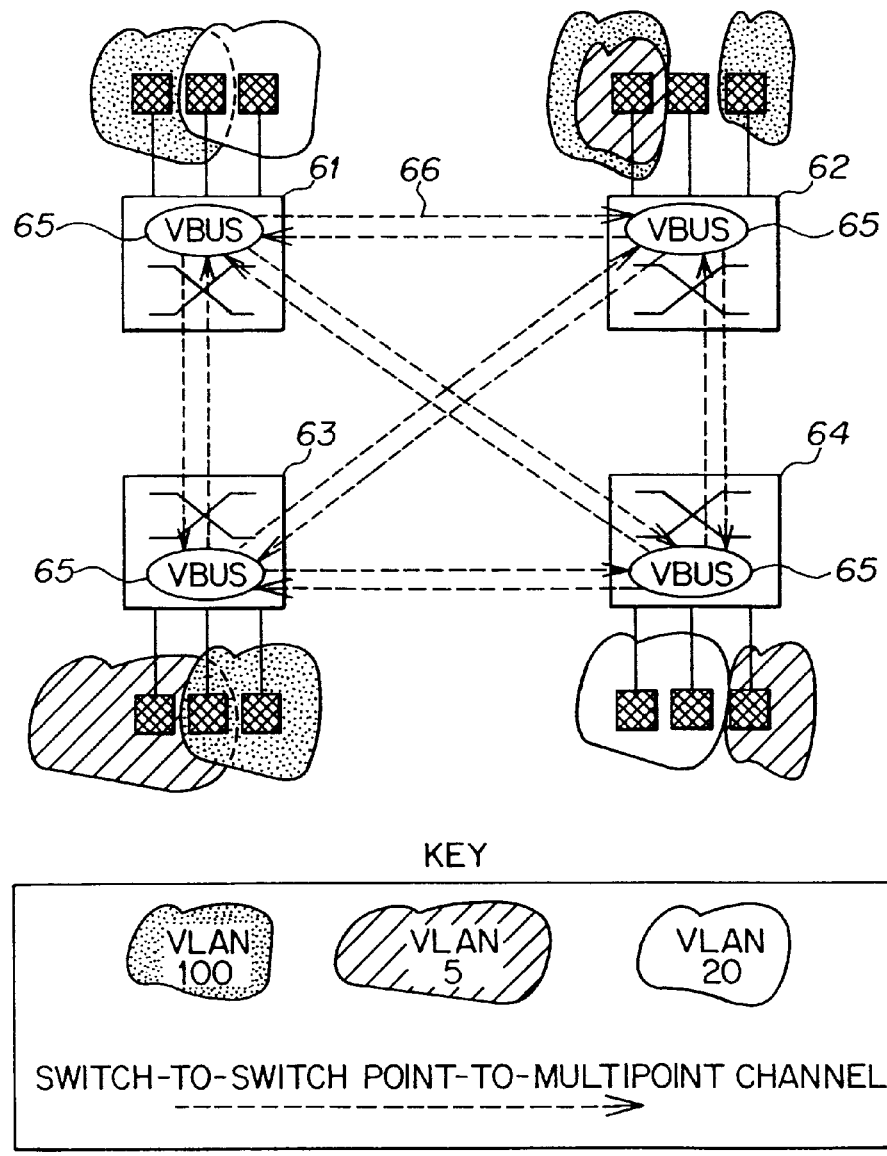
FIG. 10 is a schematic illustration of a network topology utilizing a distributed VBUS server according to an alternative embodiment of the present invention.

Since point-to-point connections between switches does not scale well, in an alternative embodiment each switch has a connection to a single (or distributed) server in the network which will forward broadcast and multicast packets. This service, referred to as the Virtual Broadcast/Unknown Service (VBUS), is distributed into all SFPS switches in a first implementation as illustrated in FIG. 10. Switches 61, 62, 63, 64 are connected by multicast channel 66, and each switch includes the distributed VBUS service 65.

Figure 11:
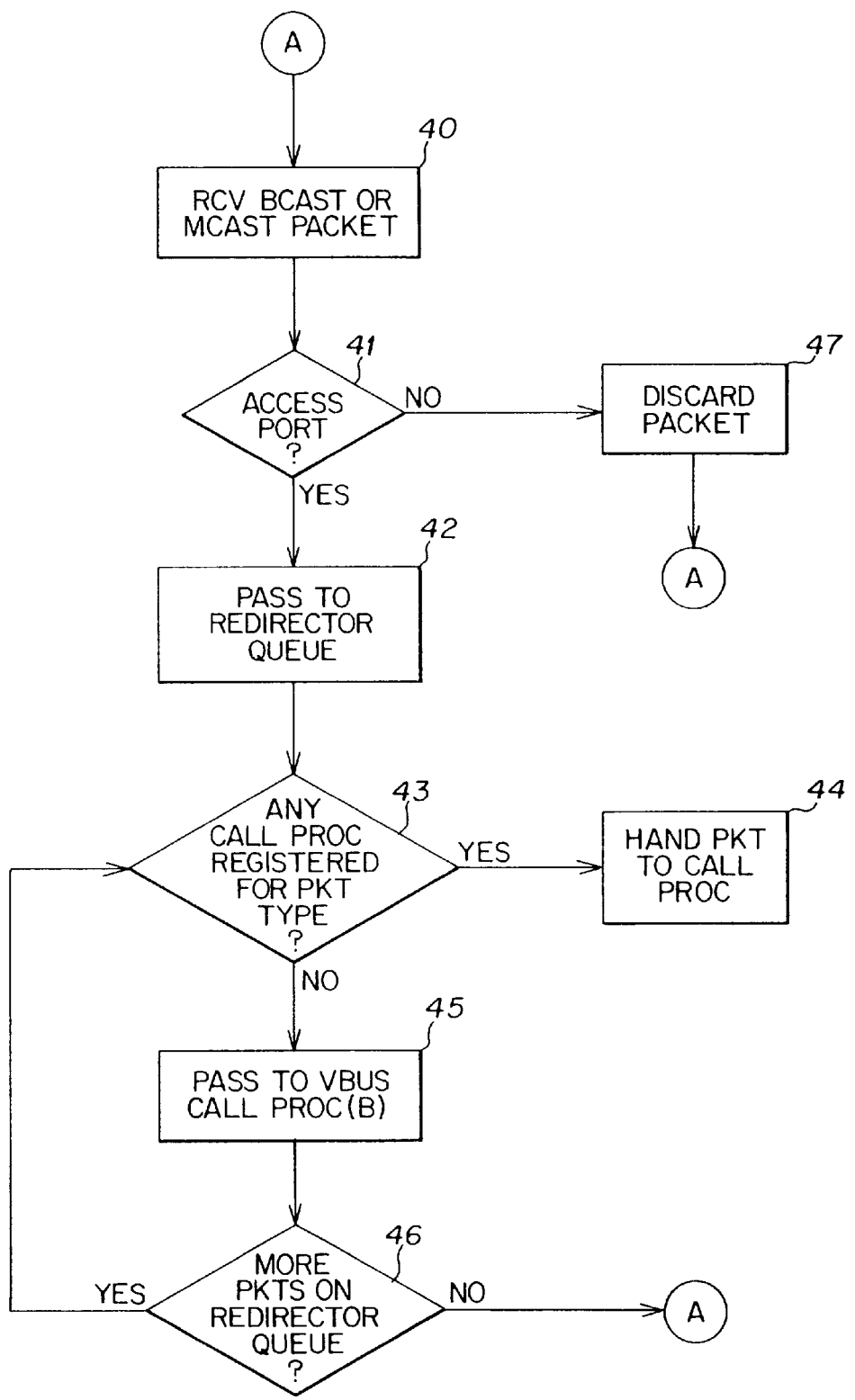
FIG. 11 is a flow chart showing the redirected flow of a broadcast or multicast packet to the VBUS service.

FIG. 11 illustrates the redirected flow of data packets for the VBUS service. When a first switch receives a broadcast or multicast packet (step 40), it first determines whether the packet was received on an access port (step 41). If no, the packet is discarded (step 47). If yes, the packet is passed to a redirector queue (step 42), and if a call processor supports the packet type (step 43), the redirector delivers the packet to the protocol-specific call processor (step 44). If not, the packet is passed to the VBUS call processor (step 45). The redirector queue then handles the next packet on the queue (step 46).

Figure 12:
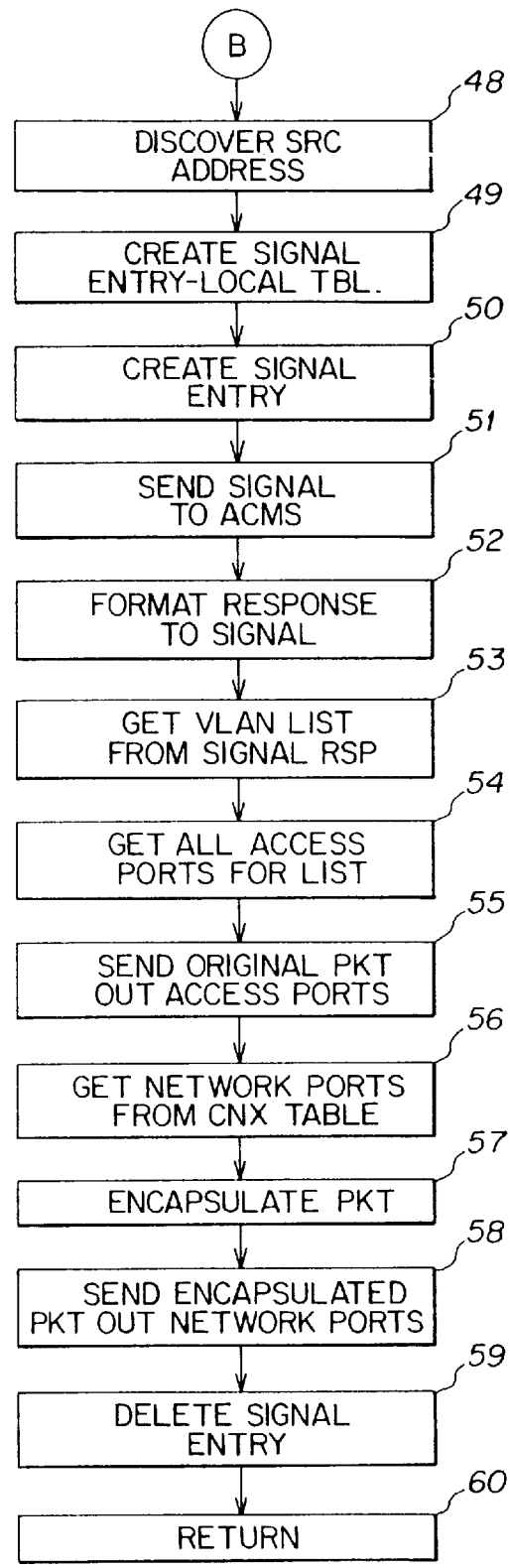
FIG. 12 is a flow chart showing the call processing performed by the VBUS service.

FIG. 12 illustrates the operation of the VBUS call processor. Each switch listens for source addresses heard on each access port (step 48). The call processor then updates the End System/VLAN table with the access port and end systems heard (step 49). The call processor then creates a signal entry (step 50) which is sent to the connection server (step 51), which formats a response to the signal (step 52). The connection server returns a signal with the associated VLAN list, which is received by the call processor (step 53). The call processor gets the associated access ports from the VLAN/Access Port Table (step 54) and sends out the original packet on the associated access ports (step 55). The call processor gets the network ports from the switch's connection table (step 56), encapsulates the packet with the VLAN header (step 57), and sends the encapsulated packet out the network ports to the other switches (step 58). The call processor then deletes the signal entry (step 59) and returns to start (step 60).

Figure 13:
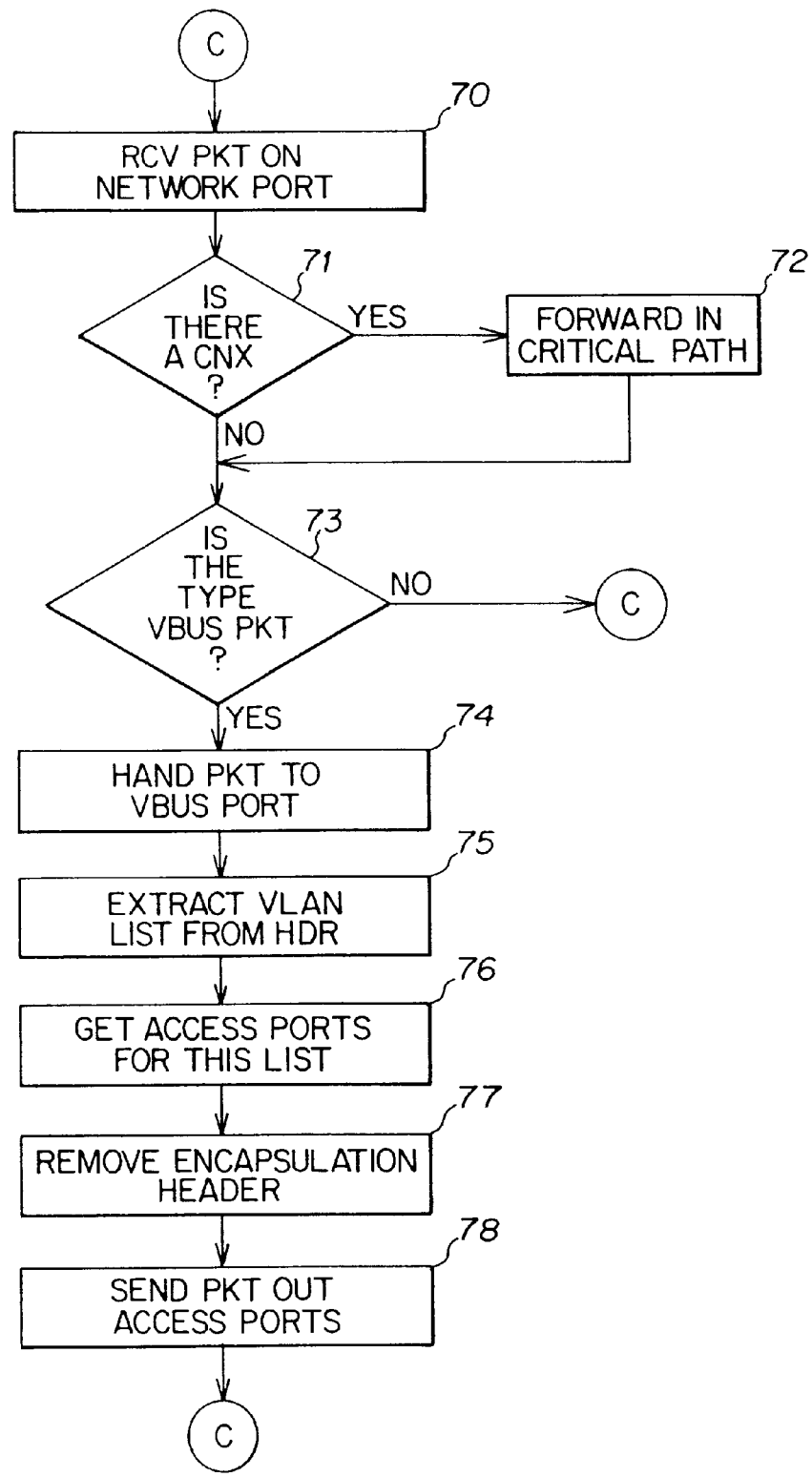
FIG. 13 is a flow chart showing the channel listening process of the VBUS service.

FIG. 13 illustrates the operation of the VBUS channel listener. When a packet is received on a network port (step 70), it first determines whether there is a known connection in the connection database 82 (step 71), and if so, it forwards the packet out the appropriate outport (step 72). If there is no connection, it determines whether this is a VBUS packet (step 73). If no, it returns to the beginning. If it is a VBUS packet, the packet is handed to a VBUS port (step 74) and the VLAN list is extracted from the header (step 75). The access ports are obtained from the VLAN/Access Port Table (step 76), and the encapsulation header removed from the packet (step 77). The original packet is then sent out the associated access ports defined in the table (step 78).

In one embodiment, the switch provides a MIB interface to allow an external application to assign VLAN-IDs to access ports and/or end systems. The simplest model is to progam VLAN-IDs to the switched ports only; under this model, the administration is simpler and the VLAN assignment to end systems is implied by the switched port to which the end systems are physically connected. A more robust model would map the VLAN-IDs from policy work group definitions.

The application interface may be provided with an SNMP (Simple Network Management Protocol) MIB (management information base) which allows a simple interface to program connections via a single SNMP set message. The MIB interface provides the following semantics:

(map, unmap)[SFPS VLAN-ID][inPort][userMAC] This verb set assigns (and removes) a user MAC address and switch port to (or from) a specific VLAN.

(map-port, unmap-port)[SFPS VLAN-ID][inPort] This verb set assigns (and removes) a switch port to (or from) a specific VLAN. The switches provide managed objects accessible by the MIB which are all accessed with standard SNMP get, get next, and set messages.

In one embodiment, a VLAN status table is provided. This table allows an entire VLAN to be enable or disabled regardless of the number of user or switch ports assigned to the VLAN in the switch. Thus, it is possible to shut off a particular VLAN inside a particular switch without having to administer each individual switch port or end system.

One goal of the VBUS service is to require minimal support from the network server. The only server requirement is providing each switch with a connection to all other switches in the network (domain), which in effect provides the multicast channel for flooding VLAN packets.

While there have been shown and described several embodiments of the present invention, it will be obvious to those skilled in the art that various changes and modifications may be made therein without departing from the scope of the invention as defined by the appending claims.

What is claimed is:

1. A computer-readable storage medium comprising program instructions for restricting flooding of a data packet, of one of a broadcast, multicast and unknown destination type, in a switched data communications network, the network including a plurality of end systems and switches connected by links, the switches having access ports connected to end systems and network ports connected to other switches, the program instructions causing the network to:

a. assign at least one identifier to a respective subset of end systems;

b. map the at least one assigned identifier to an access port attached to at least one end system in the respective subset of end systems; and c. when the data packet is received from a source end system at a receiving access port of a first switch:
  i) determine one or more identifiers associated with the source end system;
  ii) encapsulate the data packet by adding a header with the one or more determined identifiers;
  iii) forward the encapsulated data packet to all or a subset of other switches in the network; and
  iv) determine if at least one access port other than the receiving access port on the first switch is associated with the one or more determined identifiers and forward the data packet out the at least one determined access port.

2. The computer-readable storage medium as recited in claim 1, further comprising instructions to cause the network to:

d. when the encapsulated data packet is received at a second switch with access ports:
  i) strip the header from the encapsulated data packet and to determine the one or more encapsulated identifiers in the header of the encapsulated data packet;
  ii) determine if at least one access port of the second switch is associated with the one or more encapsulated identifiers; and
  iii) forward the data packet out the at least one determined access port of the second switch.

3. The computer-readable storage medium as recited in claim 2, further comprising instructions to cause the network to:

listen to end systems heard on respective access ports at each switch and to maintain the end systems heard and their respective access ports in a mapping table at the respective switch; and upon receipt of a unicast packet for a destination end system unknown to the first switch, complete step c for the unicast packet and then at the next switch review the mapping table for the respective access port for the destination end system and forward the packet out the respective access port.

4. The computer-readable storage medium as recited in claim 1, further comprising instructions to cause the network to, if in step c(iv) no other access port is determined, discard the data packet.

5. The computer-readable storage medium as recited in claim 1, further comprising, in step b, instructions to cause the network to:

maintain a first table in each switch to relate the at least one assigned identifier to the end systems or access ports of the respective switch; and maintain a second table in each switch to relate the access ports of the respective switch to assigned identifiers.

6. The computer-readable storage medium as recited in claim 5, further comprising, in step c.i), instructions to cause the network to:

review the first table for the one or more identifiers associated with the source end system or the receiving access port.

7. The computer-readable storage medium as recited in claim 6, further comprising, in step c.iv), instructions to cause the network to:

review the second table for an access port associated with the one or more determined identifiers.

8. The computer-readable storage medium as recited in claim 7, wherein the assigned identifier is a virtual LAN identifier.

9. The computer-readable storage medium as recited in claim 1, wherein the received data packet is of a protocol not supported by a protocol-specific call processor in the first switch.

10. The computer-readable storage medium as recited in claim 1, further comprising instructions to cause the network to:

maintain a common registry of assigned identifiers.

11. The computer-readable storage medium as recited in claim 10, further comprising instructions to cause the network to:

register each end system or access port with the common registry, and return a list of assigned identifiers from the common registry to each switch for the end systems or access ports of the respective switch.

12. The computer-readable storage medium as recited in claim 10, further comprising instructions to cause the network to:

send a signal from the first switch to the common registry to resolve an end system or access port to its assigned identifiers.

13. The computer-readable storage medium as recited in claim 1, further comprising instructions to cause the network to:

maintain the mapping at each switch for the end system or access ports of the respective switch.

14. The computer-readable storage medium as recited in claim 1, further comprising instructions to cause the network to:

prior to assigning an identifier to a specific end system or access port, maintain a default identifier for that specific end system or access port which maps to predetermined access ports.

15. The computer-readable storage medium as recited in claim 1, further comprising instructions to cause the network to:

maintain a multicast channel of connections between all or a subset of switches and wherein step c(iii) comprises forwarding the encapsulated packet on the multicast channel.

16. The computer-readable storage medium as recited in claim 15, wherein the channel includes:

a point-to-multipoint connection from each switch to all other switches in the network.

17. The computer-readable storage medium as recited in claim 1, further comprising instructions to cause the network, at step c(iii), to provide a distributed service in the switches for forwarding the encapsulated data packet.

18. The computer-readable storage medium as recited in claim 1, further comprising instructions to cause the network to assign the identifier based on a policy work group definition.

19. The computer-readable storage medium as recited in claim 1, further comprising instructions to cause the network to:

maintain at least one mapping table at each switch for performing the mapping step.

20. The computer-readable storage medium as recited in claim 19, further comprising instructions to cause the network to:

listen to end systems heard on respective access ports at each switch and maintain the end systems heard and their respective access ports in the mapping table at the respective switch.

21. The computer-readable storage medium as recited in claim 1, further comprising instructions to cause the network to:

assign a reserved identifier without limitation as to end system and access port.

22. The computer-readable storage medium as recited in claim 1, further comprising instructions to cause the network to:

maintain a Management Information Base (MIB) interface at each switch for programming at least one mapping table, the mapping table being used to perform the mapping step.

23. The computer-readable storage medium as recited in claim 22, further comprising instructions to cause the network to:

use a Simple Network Management Protocol (SNMP) set message to maintain the mapping table at each switch.

24. The computer-readable storage medium as recited in claim 1, further comprising instructions to cause the network to:

maintain a status table at each switch to enable and disable a respective subset.

25. A computer-readable storage medium comprising program instructions for restricting flooding of a data packet, of one of a broadcast, multicast and unknown destination type, in a switch to be used in a switched data communications network, the network to include end systems and switches connected by links, the switches having access ports connected to end systems and network ports connected to other switches, the program instructions causing the switch to:

a. assign at least one identifier to a respective subset of end systems;

b. map the at least one assigned identifier to an access port attached to at least one end system in the respective subset of end systems; and c. when the data packet is received from a source end system at a receiving access port of the switch:

i) determine one or more identifiers associated with the source end system;
ii) encapsulate the data packet by adding a header with the one or more determined identifiers;
iii) forward the encapsulated data packet to all or a subset of other switches in the network; and
iv) determine if at least one access port other than the receiving access port on the switch is associated with the one or more determined identifiers and forward the data packet out the at least one determined access port.

26. The computer-readable storage medium as recited in claim 25, further comprising instructions to cause the switch to:
d. when an encapsulated data packet is received:
i) strip the header from the encapsulated data packet and determine the one or more encapsulated identifiers in the header of the encapsulated data packet;
ii) determine if at least one access port of the switch is associated with the one or more encapsulated identifiers; and
iii) forward the data packet out the at least one determined access port of the switch.

27. The computer-readable storage medium as recited in claim 26, further comprising instructions to cause the switch to:
listen to end systems heard on the access ports and to maintain the end systems heard and their respective access ports in a mapping table.

28. The computer-readable storage medium as recited in claim 25, further comprising instructions to cause the switch to, if in step c(iv) no other access port is determined, discard the data packet.

29. The computer-readable storage medium as recited in claim 25, further comprising, in step b, instructions to cause the switch to:
maintain a first table to relate the at least one assigned identifier to the end systems or access ports of the switch; and
maintain a second table to relate the access ports of the switch to assigned identifiers.

30. The computer-readable storage medium as recited in claim 29, further comprising, in step c.i), instructions to cause the switch to:
review the first table for the one or more identifiers associated with the source end system or the receiving access port.

31. The computer-readable storage medium as recited in claim 30, further comprising, in step c.iv), instructions to cause the switch to:
review the second table for an access port associated with the one or more determined identifiers.

32. The computer-readable storage medium as recited in claim 25, further comprising instructions to cause the switch to:
prior to assigning an identifier to a specific end system or access port, maintain a default identifier for that specific end system or access port which maps to predetermined access ports.

33. The computer-readable storage medium as recited in claim 25, further comprising instructions to cause the switch to:
maintain a Management Information Base (MIB) interface.

34. The computer-readable storage medium as recited in claim 33, further comprising instructions to cause the switch to:
use a Simple Network Management Protocol (SNMP) message to maintain a mapping table.

35. The computer-readable storage medium as recited in claim 25, further comprising instructions to cause the switch to:
maintain a status table to enable and disable a respective subset.

* * * * *

US006147995C1

(12) EX PARTE REEXAMINATION CERTIFICATE (6932nd)

United States Patent
Dobbins et al.

(10) Number: US 6,147,995 C1
(45) Certificate Issued: *Jul. 14, 2009

(54) METHOD FOR ESTABLISHING RESTRICTED BROADCAST GROUPS IN A SWITCHED NETWORK

(75) Inventors: Kurt Dobbins, Bedford, NH (US); Phil Andlauer, Londonderry, NH (US); Michael Skubisz, Durham, NH (US)

(73) Assignees: Wells Fargo Foothill, Inc., Santa Monica, CA (US); Obsidian, LLC, Santa Monica, CA (US)

Reexamination Request:
No. 90/008,632, May 3, 2007

Reexamination Certificate for:
Patent No.: 6,147,995
Issued: Nov. 14, 2000
Appl. No.: 09/387,317
Filed: Aug. 31, 1999

(*) Notice: This patent is subject to a terminal disclaimer.

Related U.S. Application Data

(63) Continuation of application No. 08/960,919, filed on Oct. 30, 1997, now Pat. No. 5,946,308, which is a continuation of application No. 08/559,738, filed on Nov. 15, 1995, now Pat. No. 5,684,800.

(51) Int. Cl.
H04L 12/24 (2006.01)
H04L 12/18 (2006.01)
H04L 12/46 (2006.01)
H04L 12/56 (2006.01)

(52) U.S. Cl. .................... 370/392; 370/400
(58) Field of Classification Search .......... None
See application file for complete search history.

(56) References Cited

U.S. PATENT DOCUMENTS

| 4,058,672 A | 11/1977 | Crager et al. |
| 4,348,554 A | 9/1982 | Asmuth |
| 4,419,728 A | 12/1983 | Larson |
| 4,439,636 A | 3/1984 | Newkirk et al. |
| 4,481,626 A | 11/1984 | Boggs et al. |
| 4,574,346 A | 3/1986 | Hartung |
| 4,577,313 A | 3/1986 | Sy |
| 4,627,052 A | 12/1986 | Hoare et al. |
| 4,651,318 A | 3/1987 | Luderer |
| 4,701,906 A | 10/1987 | Ransom et al. |
| 4,707,827 A | 11/1987 | Bione et al. |
| 4,823,338 A | 4/1989 | Chan et al. |
| 4,894,822 A | 1/1990 | Buhrke et al. |

(Continued)

FOREIGN PATENT DOCUMENTS

EP 0228634 7/1987

(Continued)

OTHER PUBLICATIONS

Youchi Ohteru, Interconnecting IEEE 802 LANs by a Wideband Backbone Network, 12th Conf. on Local Computer Networks, Oct. 5–7, 1987, IEEE Computer Society.

(Continued)

Primary Examiner—Christopher E Lee

(57) ABSTRACT

Method and apparatus for establishing restricted broadcast groups in a switched network. The method assigns different virtual LAN identifiers (VLAN-IDs) to different subsets of associated end systems or access ports. Tables are maintained for mapping the VLAN-IDs with associated end systems and access ports. When a broadcast packet is received at a first switch, it is encapsulated with a VLAN header, including the VLAN-IDs, and sent out a multicast channel to all other switches in the network (domain). The original packet is sent out the other access ports of the receiving switch for the designated VLAN-IDs. The switches receiving the VLAN packet remove the header and send the original packet out access ports associated with the VLAN-IDs extracted from the header. The method provides a mechanism for forwarding broadcast packets of a protocol not supported by the switching mechanism, as well as multicast packets and unicast packets from undiscovered end systems.

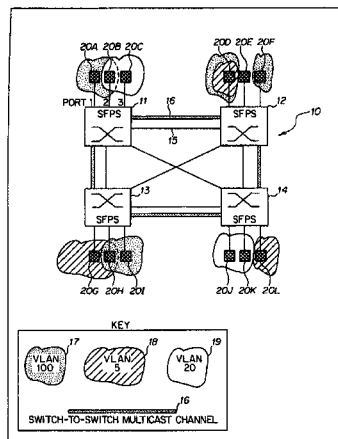

U.S. PATENT DOCUMENTS

| | | | |
|---|---|---|---|
| 4,894,826 A | 1/1990 | Aggers et al. |
| 4,912,656 A | 3/1990 | Cain et al. |
| 4,922,486 A | 5/1990 | Lidinsky et al. |
| 4,937,586 A | 6/1990 | Natarajan |
| 5,060,228 A | 10/1991 | Tsutsui et al. |
| 5,090,025 A | 2/1992 | Marshall et al. |
| 5,132,926 A | 7/1992 | MacEachern et al. |
| 5,136,580 A | 8/1992 | Videlock et al. |
| 5,168,496 A | 12/1992 | Ohba et al. |
| 5,220,562 A | 6/1993 | Takada et al. |
| 5,226,039 A | 7/1993 | Frank et al. |
| 5,251,205 A | 10/1993 | Callon et al. |
| 5,265,092 A | 11/1993 | Soloway et al. |
| 5,280,480 A | 1/1994 | Pitt et al. |
| 5,297,143 A | 3/1994 | Fridrich et al. |
| 5,311,593 A | 5/1994 | Carmi |
| 5,321,693 A | 6/1994 | Perlman |
| 5,345,587 A | 9/1994 | Fehskens et al. |
| 5,379,296 A | 1/1995 | Johnson et al. |
| 5,394,402 A | 2/1995 | Ross |
| 5,396,493 A | 3/1995 | Sugiyama |
| 5,398,242 A | 3/1995 | Perlman |
| 5,444,702 A | 8/1995 | Burnett et al. |
| 5,485,455 A | 1/1996 | Dobbins et al. |
| 5,491,694 A | 2/1996 | Oliver et al. |
| 5,521,910 A | 5/1996 | Matthews |
| 5,530,703 A | 6/1996 | Liu et al. |
| 5,550,816 A | 8/1996 | Hardwick et al. |
| 5,579,480 A | 11/1996 | Cidon et al. |
| 5,583,996 A | 12/1996 | Tsuchiya |
| 5,617,421 A | 4/1997 | Chin et al. |
| 5,623,605 A | 4/1997 | Keshav et al. |
| 5,633,869 A | 5/1997 | Burnett et al. |
| 5,636,371 A | 6/1997 | Yu |
| 5,644,571 A | 7/1997 | Seaman |
| 5,684,800 A | 11/1997 | Dobbins et al. |
| 5,734,865 A | 3/1998 | Yu |
| 5,740,171 A | 4/1998 | Mazzola et al. |
| 5,741,171 A | 4/1998 | Sarfaty et al. |
| 5,752,003 A | 5/1998 | Hart |
| 5,796,727 A | 8/1998 | Harrison et al. |
| 5,825,772 A | 10/1998 | Dobbins et al. |
| 5,862,338 A | 1/1999 | Walker et al. |
| 5,892,910 A | 4/1999 | Safadi |
| 5,892,912 A | 4/1999 | Suzuki et al. |
| 5,946,308 A | 8/1999 | Dobbins et al. |
| 5,963,556 A | 10/1999 | Varghese et al. |
| 6,005,864 A | 12/1999 | Krause |
| 6,041,166 A | 3/2000 | Hart et al. |
| 6,128,665 A | 10/2000 | Iturralde |
| 6,269,404 B1 | 7/2001 | Hart et al. |
| 6,426,954 B1 | 7/2002 | Krause |
| 6,560,236 B1 | 5/2003 | Varghese et al. |
| 6,711,171 B1 | 3/2004 | Dobbins et al. |

FOREIGN PATENT DOCUMENTS

| | | | |
|---|---|---|---|
| EP | 0253421 | | 1/1988 |
| EP | 0260043 | | 3/1988 |
| EP | 0282198 | | 9/1988 |
| EP | 0161031 | | 7/1989 |
| EP | 0405042 | | 9/1994 |
| EP | 0480555 | | 9/1996 |
| GB | 2268376 | | 1/1994 |
| JP | 61-253952 | | 11/1986 |
| JP | 63-222538 | | 9/1988 |
| WO | WO 95/01023 | | 1/1995 |
| WO | WO 95/04420 | A3 | 2/1995 |
| WO | WO 95/04420 | A2 | 2/1995 |
| WO | WO 96/18451 | | 6/1996 |
| WO | WO 96/18629 | | 6/1996 |

OTHER PUBLICATIONS

Bell Communication, "Generic System Requirements ISO Switched Multi–Megabit Data Service," Bellcore Technical Reference, Issue 1 (May 1991).

IEEE 802.1 Working Group, IEEE 802.1—1995 Document Register (1995).

"Bridges vs. Routers: Comparing Functionality, How are bridges and routers and integrated functionality bridge/routers being used to meet the demands of today's internetworking environment?", Telecommunications, Americas Edition Vo. 27, No. 4 (Apr. 1993).

"Broadband Future Faces Snarls and Gnarls," Business communications Review (Dec. 1993).

Interoffice Memorandum from Ellen Minter regarding Education and Science, "Education and Science: Advancing Knowledge and Innovation," IBU DECworld Update (Mar. 3, 1992).

"Crescendo, Kalpma, and Alantec, Third party networking add ons for SPARC servers," Sun Microsystems, Inc. (1992).

"Clearpoint Demonstrates Frame Relay Support in Interop Frame Relay Solutions Showcase TCPIIP Support Also Features," Press Release (Sep. 23, 1991).

Digital GIGAswitch/Router User Reference Manual—Part No. 32684–03 (Dec. 1999).

Foundry Networks, Foundry EdgeIron Users Guide—Chapter 21: 802.1Q VLANs (Mar. 2005).

"Scalable Hardware for the Internet Future," Foundry Networks System Architectures (Oct. 11, 1995).

Backes, Floyd, "Spanning Tree Bridges—Transparent Bridges for Interconnection of IEEE 802 LANs", IEEE Network: The Magaizine of Computer Communications, vol. 2, No. 1, 5–9, Jan. 1988.

Baker, F., Network Working Group, Point to Point Protocol Extensions for Bridging (Apr. 1991).

Braden, R., Internet Engineering Task Force, Requirement for Internet Hosts—Communication Layers (Oct. 1989).

Bradner & Greenfield, "Manageability, not speed, is crucial among routers," PC Magazine (Mar. 30, 1993).

Bunn, J.J., "DECCO Project", Trip Report: DECworld, Boston (May 18, 1992).

Catania, V., et al., "A Routing Strategy for MAN Interconnection", IEEE, pp. 608–615. (1991).

Chen & Chang, "Efficient multicast source routing scheme," Computer Communications vol. 16, No. 10, 662–666 (1993).

Claffy, et. al., "A Parameterizable Methodology for Internet Traffic Flow Profiling," IEEE Journal on Selected Areas in Communications, vol. 13, No. 8 (Oct. 8, 1995).

Crocetti, P., et. al., "Multicast in SMDS over an ATM network" Proc. Globecorn '92, vol. 2, 1062–66 (1992).

de Vries, Rein J.F., "ATM Multicast Connections Using the Gauss Switch," Proc. Globecom '90—Communications: Connecting the Future vol. 1,21 (1990).

Deering, Stephen, "Multicast Routing in Internetworks and Extended LANs," ACM Press: SIGCOMM '88 Symposium—Communications Architectures & Protocols, vol. 25, No. 1, 88–101 (Aug. 16, 1988).

Emigh, Jacqueline, "Digital runs 200 MHz chip—1st demo of Alpha—Digital Equipment Corporation's (DEC's) Alpha microprocessor," Newsbytes News Network, DECWorld (May 4, 1992).

Eng, KY, et. al., "Multicast and Broadcast Services in a Knockout Packet Switch," MFOCOM '88. Networks: Evolution or Revolution? Proceedings. Seventh Annual Joint Conference of the IEEE Computer and Communications Societies., IEEE, 29–34 (1988).

Foster, Ian, Designing and Building Parallel Programs, (Addison Wesley Nov. 2003).

Greer, Lou, "Would You Believe . . . DECWorld 2001" by Lou Greer (Jun. 25, 2001).

Grimshaw, Michael, "LAN Interconnections Technologies, Interconnecting LANs is one thing, but avoiding loops, responding to network failures, and interoperating different LANs is quite another," Telecommunications North American Edition vol. 25, No. 2 (Feb. 1991).

Harris and Jeffreies, Inc., A Proposal for Software Development; Prepared for: Tony Bono (Clearpoint Research Corp.); For an IP–Router Facility (Feb. 19, 1991).

Hawe, Bill, et. al., "Transparent Interconnection of Local Area Networks with Bridges," Journal of Telecommunciation Networks, vol. 3, No. 2, 116–130.

Jennings, Tate, et. al., "Practical SMDS Demonstrations," Proceedings 17th Conference on Local Computer Networks, 300–309 (Sep. 13, 1992).

Kaliszewski, J. M., "Routing Algorithm and Route Optimization on SITA Data Transport Network", IEEE, pp. 892–897 (1983).

Kelley, Paul, "Connecting LANs with Bridges, Systems managers have a number of decisions to make when linking LANs together, including just how far a bridge will go and which one to cross," Telecommunications North American Edition, vol. 24, No. 6, article titled (Jun. 1990).

King, Steven, "It's an Adventure (Part 2/3)," Network World, vol. 12, No. 15, Apr. 10, 1995, pp. 49–55.

Kim, Hyong S.; "Multinet Switch: Multistage ATM Switch Architecture with Partially Shared Buffers," IEEE Infocom '93: The Conference on Computer Communications Proceedings vol. 2 (Mar. 28, 1993).

Lai, Wai Sum, "Packet Forwarding", IEEE Communications Magazine, vol. 26. No. 7), pp. 8–17 (Jul. 1988).

Lidinsky, William, "802.1 Minutes and Document Plan," Presentation at IEEE 802.1 Working Group, West Palm Beach (Mar. 1995).

Lin & Wang, "A Platform for Seamless Interworking Among Conventional LANs and ATM Networks," Global Telecommunications Conference, 1994. GLOBCOM '94. 'Communications: The Global Bridge'., IEEE, vol. 1,291–5.

Marchok, Daniel, et. al., "Multicasting in a Growable Packet (ATM) Switch," INFOCOM '91. Proceedings. Tenth Annual Joint Conference of the IEEE Computer and Communications Societies. Networking in the 90s. IEEE, vol. 2, 850–858 (Apr. 7, 1991).

McNealis, Martin, "1995—The Year of the Virtual LAN," Presentation at IEEE Conference, Maui (Jul. 1995).

McNealis, Martin, "Virtual LAN Requirements," Presentation at IEEE 802.1 Interim Meeting (Oct. 12, 1995).

Newman, Peter, "ATM Switching, ATM Local Area Networks, LAN emulation offers a best–effort, connectionless, packet transfer service at the MAC Sublayer, implemented on top of a connection–oriented ATM network," IEEE Communications Magazine (Mar. 1994).

Ngoh, L.H., "Multicast support for group communications," Computer Networks and ISDN Systems 22 (1991).

Paliwoda, K., "Transactions involving multicast," Comp. Comm'ns, vol. 11, No. 6, 313–18 (Dec. 1988).

Quarterman, J.S., et al., "An Alternate Path Routing Scheme Supporting QOS and Fast Connection Setup in ATM Networks", IEEE, pp. 1224–1230 (Oct. 1996).

Rajagopalan, Bala, "Reliability and Scaling Issues in Multicast Communication," Computer Communication Review: SIGCOMM '92 Conference Proceedings, Communications Architectures and Protocols, vol. 22, No. 4 (Aug. 17, 1992).

Rooney, Sean et al.; Computer Communication Review: Automatic VLAN creation based on–line measurement (Feb. 19, 1991).

Rozenblad, et. al. W., "Interconnection of LANsB02.6 Customer Premises Equipments (CPEs) via SMDS on Top of ATM: a case description," IFIP Transactions, vol. C–14: Proceedings of the FFIP TC61WG6.4 Fourth International Conference on High Performance Networking IV, 43 1–442 (Dec. 14, 1992).

Segall, Adrian, et. al., "Reliable Multiuser Tree Setup with Local Identifiers," IEEE Journal on Selected Areas in Communications, vol. 9, No. 9 (Dec. 1991).

Shimada, K. Karl, "VLAN Classes," Presentation at IEEE 802.1 Interim Meeting (Oct. 11, 1995).

Shimada, K. Karl, "VLAN Requirements," Presentation at IEEE 802.1 Interim Meeting (Oct. 11, 1995).

Shimada, K. Karl, "VLAN Definition," Presentation at IEEE 802.1 Interim Meeting (Oct. 11, 1995).

Shrimpton, David; Cooper, Christopher; "Multicast communication on the Unison network," Computer Communication: network architecture (1990).

Sincoskie & Cotton, "Extended Bridge Algorithms for Large Networks," IEEE Network: The Magazine of Computer Communications, vol. 2, No. 1 (Jan. 1988).

Souza, et. al. R., "GIGAswitch System: A High–Performance Packet–Switching Platform," Digital Technical Journal, vol. 6 No. 1,9–22 (1994).

Spiegal, E. M., et al., "An Alternate Path Routing Scheme Supporting QOS and Fast Connection Setup in ATM Networks", IEEE, pp. 1224–1230 (1994).

Sterbenz, James P.G., et. al., Report and Discussion on the IEEE ComSoc TCGN Gigabit Networking Workshop 1995, IEEE Network (Jul. 1995).

Tantawy & Zitterbart, "A Scheme for High–Performance LAN Interconnection Across Public MAN'S," IEEE Journal on Selected Areas in Communications, vol. 11, No. 8 (Oct. 1993).

Tantawy & Zitterbart, "A Scheme for Remote LAN Bridging across SMDS MANS," Proc. Globecom '92, vol. 1 (1992).

Tobagi, Fouad A., "Fast packet switch architectures for broadband integrated services digital networks", Proc. IEEE 133–67 (1 990).

Tu & Leung, "Multicast Connection–Oriented Packet Switching Network," Proc. Of SUPERCOMM Int'l Conference on Conference on Comm'ns (1990).

Wakerly, John, "Alantec Intelligent Switching Hubs, Some VLAN Styles," Presentation from the IEEE 802.1 Meeting (Oct. 11, 1995).

Yum & Chen, "Multicast Source Routing in Packet–Switched Networks," IEEE Infocom '91—Networking in the 90s, The Conference on Computer Communications Proceedings vol. 3, (Apr. 7, 1991).

"Virtual LANs Get Real," Data Communications, vol. 24, No. 3, Mar. 1995, pp. 87–100".

Feature: Virtual LAN Switch backbone support companies, Network World (Apr. 10, 1995).

IEEE 802 Standards Committee, Instructions to the Editor for the revision of Overview and Architecture, IEEE Doc. P802.1–95/007 (Jul. 12, 1995).

IEEE 802 Standards Committee, Instructions to the Editor for P802, and Ballot Summary, IEEE Doc. P802.1–95/008 (Jul. 12, 1995).

IEEE 802 Standards Committee, "Proposed comments on ISO/IEC 10038PDAM 2," IEEE Doc. P802.1–95/009 (Jul. 12, 1995).

IEEE 802 Standards Committee, "Proposed comments on ISO/IEC 15802–5PDAM 1" Doc. P802.1–95/010 (Jul. 12, 1995).

IEEE 802 Standards Committee, "802.1 Resolution on progression of VLAN work," IEEE Resolution (Jul. 1995).

IEEE 802.1 Working Group, "IEEE 802.1 Working Group, Minutes of the Mar. 1995 Meeting" (Mar. 1995).

Presentation titled "1995—The Year of the Virtual LAN," IEEE Conference, Maui, Jul. 1995.

Petrosky, M., "Switching Strategy Will be Key as Internet Markets Collide," Network World, 11(8); p. 34, Feb. 21, 1994.

MacAskill, S., "Cableton Preps Modules for MMAC–Plus Hub," Network World, 11, 18; p. 32, May 2, 1994.

Hemmady, J.G., "Metropolitan Area Network Genetic Framework System Requirements in Support of Switched Multi–Megabit Data Service," Bellcore Technical Advisory TA–TSY–000772 Bell Communications Research, Part 1, pp. 1–1–12–1, Feb. 1988.

Catalyst 1200 Installation and Configuration Guide, vol. 7, No. 1. 1995.

Cheriton, D.R., "Sirpent: A High–Performance Internetworking Approach," Sigcomm '89 Symposium, Communications Architectures & Protocols, Sep. 19–22, 1989.

Computer History Museum: Where Computing History Lives, Mar. 30, 2006, <http://www.computerhistory.org/>.

Ernigh, J., "DECWorld: DEC Intros High–Speed Networking Gigaswitch"—Product Announcement, Newbytes News Network, May 7, 1992.

Morency, J. et al., "Virtual LANs Promise Big Gains, Pose New Risks," Network World, May 2, 1994.

Ohteru, Y., Interconnecting IEEE 802 LANs by a Wideband Backbone Network, IEEE, 1987.

Bonomi, Flavio and Fendick, Kerry W., The Rate–Based Flow Control Framework for the Available Bit Rate ATM Service, IEEE Network, Mar./Apr. 1995 pp. 25–39.

Cohen, Jodi, VLANs Set to Enhance Their Value Through Policy–Based Management, Local Networks, Aug. 14, 1995, p. 23.

Goldberg, Michael, Stratus Computer Turns on Radio, A Fault–Tolerant Server, Computer World, Workgroup Computing, Oct. 30, 1995, p. 59.

Kung, H.T. and Morris, Robert, Credit–Based Flow Control for ATM Networks, IEEE Network, Mar./Apr. 1995, p. 40–48.

Lawton, Stephen, Digital Unveils Virtual Architecture, Digital News & Review, Apr. 24, 1995, p. 9–10.

Ramakrishan, K.K. and Newman, Peter, Integration of Rate and Credit Schemes for ATM Flow Control, IEEE Network, Mar./Apr. 1995, pp. 49–56.

Stankovic, John A., Spuri, Marco, Di Natale, March and Buttazzo, Giorgio C., Implications of Classical Scheduling Results for Real–Time Systems, IEEE Network, Jun. 1995, pp. 16–25.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8, 10–13, 15–17, 19, 20 and 25–31 is confirmed.

New claims 36–39 are added and determined to be patentable.

Claims 9, 14, 18, 21–24 and 32–35 were not reexamined.

*36. The computer-readable storage medium as recited in claim 1, further comprising instructions to cause the network to:*

*listen to end systems heard on respective access ports at each switch and to maintain the end systems heard and their respective access ports in a mapping table at the respective switch; and*

*upon receipt of a unicast packet for a destination end system unknown to the first switch, complete step c for the unicast packet and then at the next switch review the mapping table for the respective access port for the destination end system and forward the packet out the respective access port.*

*37. The computer-readable storage medium as recited in claim 1, further comprising instructions to cause the network to:*

*maintain a table in each switch including mapping information that maps the at least one assigned identifier to respective end system identifiers of the end systems of the respective switch.*

*38. The computer-readable storage medium as recited in claim 25, further comprising instructions to cause the switch to:*

*listen to end systems heard on the access ports and to maintain the end systems heard and their respective access ports in a mapping table; and*

*upon receipt of a unicast packet for a destination end system unknown to the switch, complete step c for the unicast packet and then at the next switch review the mapping table for the respective access port for the destination end system and forward the packet out the respective access port.*

*39. The computer-readable storage medium as recited in claim 25, further comprising instructions to cause the switch to:*

*maintain a table including mapping information that maps the at least one assigned identifier to respective end system identifiers of the end systems of the switch.*

\* \* \* \* \*

(12) EX PARTE REEXAMINATION CERTIFICATE (7596th)
United States Patent
Dobbins et al.

(10) Number: US 6,147,995 C2
(45) Certificate Issued: Jul. 6, 2010

(54) METHOD FOR ESTABLISHING RESTRICTED BROADCAST GROUPS IN A SWITCHED NETWORK

(75) Inventors: Kurt Dobbins, Bedford, NH (US); Phil Andlauer, Londonderry, NH (US); Michael Skubisz, Durham, NH (US)

(73) Assignees: Wells Fargo Foothill, Inc., Santa Monica, CA (US); Obsidian, LLC, Santa Monica, CA (US)

Reexamination Request:
No. 90/010,637, Aug. 7, 2009

Reexamination Certificate for:
Patent No.: 6,147,995
Issued: Nov. 14, 2000
Appl. No.: 09/387,317
Filed: Aug. 31, 1999

Reexamination Certificate C1 6,147,995 issued Jul. 14, 2009

Related U.S. Application Data

(63) Continuation of application No. 08/960,919, filed on Oct. 30, 1997, now Pat. No. 5,946,308, which is a continuation of application No. 08/559,738, filed on Nov. 15, 1995, now Pat. No. 5,684,800.

(51) Int. Cl.
*H04L 12/24* (2006.01)
*H04L 12/18* (2006.01)
*H04L 12/46* (2006.01)
*H04L 12/56* (2006.01)

(52) U.S. Cl. ........................................ 370/392; 370/400
(58) Field of Classification Search .......................... None
See application file for complete search history.

(56) References Cited

U.S. PATENT DOCUMENTS

| 4,058,672 A | 11/1977 | Crager et al. |
| 4,348,554 A | 9/1982 | Asmuth |
| 4,419,728 A | 12/1983 | Larson |
| 4,439,636 A | 3/1984 | Newkirk et al. |
| 4,481,626 A | 11/1984 | Boggs et al. |

(Continued)

FOREIGN PATENT DOCUMENTS

| EP | 0228634 | 7/1987 |
| EP | 0253421 | 1/1988 |
| EP | 0260043 | 3/1988 |
| EP | 0282198 | 9/1988 |
| EP | 0161031 | 7/1989 |

(Continued)

OTHER PUBLICATIONS

Newman, Peter, "ATM Local Area Networks", IEEE Communications Magazine, pp. 86098, Mar. 1994.

Bellman, Robert, "Evolving Traditional LANs to ATM (local area network; asynchronous transfer mdoe)" (includes related article), Business Communications Review, Oct. 1, 1994. Available online at http://www.highbeam.com/doc/1G1–16641788.html, last visited on Aug. 3, 2009.

(Continued)

*Primary Examiner*—Woo H. Choi

(57) ABSTRACT

Method and apparatus for establishing restricted broadcast groups in a switched network. The method assigns different virtual LAN identifiers (VLAN-IDs) to different subsets of associated end systems or access ports. Tables are maintained for mapping the VLAN-IDs with associated end systems and access ports. When a broadcast packet is received at a first switch, it is encapsulated with a VLAN header, including the VLAN-IDs, and sent out a multicast channel to all other switches in the network (domain). The original packet is sent out the other access ports of the receiving switch for the designated VLAN-IDs. The switches receiving the VLAN packet remove the header and send the original packet out access ports associated with the VLAN-IDs extracted from the header. The method provides a mechanism for forwarding broadcast packets of a protocol not supported by the switching mechanism, as well as multicast packets and unicast packets from undiscovered end systems.

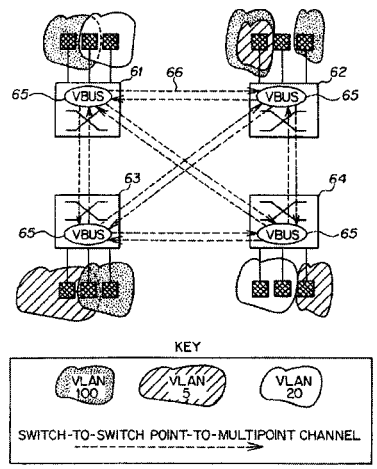

U.S. PATENT DOCUMENTS

| | | |
|---|---|---|
| 4,574,346 A | 3/1986 | Hartung |
| 4,577,313 A | 3/1986 | Sy |
| 4,627,052 A | 12/1986 | Hoare et al. |
| 4,651,318 A | 3/1987 | Luderer |
| 4,677,588 A | 6/1987 | Benjamin et al. |
| 4,701,906 A | 10/1987 | Ransom et al. |
| 4,707,827 A | 11/1987 | Bione et al. |
| 4,823,338 A | 4/1989 | Chan et al. |
| 4,894,822 A | 1/1990 | Buhrke et al. |
| 4,894,826 A | 1/1990 | Aggers et al. |
| 4,912,656 A | 3/1990 | Cain et al. |
| 4,922,486 A | 5/1990 | Lidinsky |
| 4,937,856 A | 6/1990 | Natarajan |
| 5,056,085 A | 10/1991 | Vu |
| 5,060,228 A | 10/1991 | Tsutsui et al. |
| 5,090,025 A | 2/1992 | Marshall et al. |
| 5,132,926 A | 7/1992 | MacEachern et al. |
| 5,136,580 A | 8/1992 | Videlock et al. |
| 5,168,496 A | 12/1992 | Ohba et al. |
| 5,193,152 A | 3/1993 | Smith |
| 5,220,562 A | 6/1993 | Takada et al. |
| 5,226,039 A | 7/1993 | Frank et al. |
| 5,251,205 A | 10/1993 | Callon et al. |
| 5,265,092 A | 11/1993 | Soloway et al. |
| 5,280,480 A | 1/1994 | Pitt et al. |
| 5,297,143 A | 3/1994 | Fridrich et al. |
| 5,309,437 A | 5/1994 | Perlman et al. |
| 5,311,593 A | 5/1994 | Carmi |
| 5,321,693 A | 6/1994 | Perlman |
| 5,323,394 A | 6/1994 | Perlman |
| 5,327,534 A | 7/1994 | Hutchison et al. |
| 5,345,587 A | 9/1994 | Fehskens et al. |
| 5,355,371 A | 10/1994 | Auerbach et al. |
| 5,379,296 A | 1/1995 | Johnson et al. |
| 5,394,402 A | 2/1995 | Ross |
| 5,396,493 A | 3/1995 | Sugiyama |
| 5,398,242 A | 3/1995 | Perlman |
| 5,444,702 A | 8/1995 | Burnett et al. |
| 5,485,455 A | 1/1996 | Dobbins et al. |
| 5,491,694 A | 2/1996 | Oliver et al. |
| 5,497,368 A | 3/1996 | Reijnierse et al. |
| 5,500,860 A | 3/1996 | Perlman et al. |
| 5,521,910 A | 5/1996 | Matthews |
| 5,530,703 A | 6/1996 | Liu et al. |
| 5,550,816 A | 8/1996 | Hardwick et al. |
| 5,559,883 A | 9/1996 | Williams |
| 5,579,480 A | 11/1996 | Cidon et al. |
| 5,583,996 A | 12/1996 | Tsuchiya |
| 5,606,669 A | 2/1997 | Bertin et al. |
| 5,610,904 A | 3/1997 | Eng et al. |
| 5,617,421 A | 4/1997 | Chin et al. |
| 5,623,605 A | 4/1997 | Keshav et al. |
| 5,633,869 A | 5/1997 | Burnett et al. |
| 5,636,371 A | 6/1997 | Yu |
| 5,644,571 A | 7/1997 | Seaman |
| 5,684,800 A | 11/1997 | Dobbins et al. |
| 5,699,347 A | 12/1997 | Callon |
| 5,734,824 A | 3/1998 | Choi |
| 5,734,865 A | 3/1998 | Yu |
| 5,740,171 A | 4/1998 | Mazzola et al. |
| 5,741,171 A | 4/1998 | Sarfaty et al. |
| 5,751,967 A | 5/1998 | Raab |
| 5,752,003 A | 5/1998 | Hart |
| 5,796,727 A | 8/1998 | Harrison et al. |
| 5,796,736 A | 8/1998 | Suzuki |
| 5,802,392 A | 9/1998 | Epstein et al. |
| 5,825,772 A | 10/1998 | Dobbins et al. |
| 5,862,338 A | 1/1999 | Walker et al. |
| 5,881,243 A | 3/1999 | Zaumen et al. |
| 5,892,910 A | 4/1999 | Safadi |
| 5,892,912 A | 4/1999 | Suzuki et al. |
| 5,946,308 A | 8/1999 | Dobbins et al. |
| 5,963,556 A | 10/1999 | Varghese et al. |
| 6,005,864 A | 12/1999 | Krause |
| 6,016,306 A | 1/2000 | Le Boudec et al. |
| 6,041,166 A | 3/2000 | Hart et al. |
| 6,119,171 A | 9/2000 | Alkhatib |
| 6,128,665 A | 10/2000 | Iturralde |
| 6,151,319 A | 11/2000 | Dommety et al. |
| 6,151,324 A | 11/2000 | Belser et al. |
| 6,269,404 B1 | 7/2001 | Hart et al. |
| 6,426,954 B1 | 7/2002 | Krause |
| 6,560,236 B1 | 5/2003 | Varghese et al. |
| 6,711,171 B1 | 3/2004 | Dobbins et al. |

FOREIGN PATENT DOCUMENTS

| | | |
|---|---|---|
| EP | 0609990 A2 | 8/1994 |
| EP | 0405042 | 9/1994 |
| EP | 0480555 | 9/1996 |
| GB | 2268376 | 1/1994 |
| JP | 61-253952 | 11/1986 |
| JP | 63-222538 | 9/1988 |
| WO | 95/01023 | 1/1995 |
| WO | 95/04420 A2 | 2/1995 |
| WO | 96/18451 | 6/1996 |
| WO | 96/18629 | 6/1996 |

OTHER PUBLICATIONS

Kent, William, "A Simple Guide to Five Normal Forms in Relational Database Theory", Communications of the ACM 26 (2), Feb. 1983, 120–125. Also IBM Technical Report TR03.159, Aug. 1981.

McCloghrie, Keith, et al, RFC 1213 "Management Information Base for Network Management of TCP/IP–based Internets: MIB–II" Performance Systems International, Mar. 1991, pp. 1–66.

IEEE 802.10 Standard, IEEE Standards for Local and Metropolitan Area Networks: Interoperable LAN/MAN Security (SILS), Approved Sep. 17, 1992, published 1993 by IEEE (IEEE 802.10 Standard).

Bonomi, Flavio and Fendick, Kerry W., The Rate–Based Flow Control Framework for the Available Bit Rate ATM Service, IEEE Network, Mar./Apr. 1995, pp. 25–39.

Cohen, Jodi, VLANS Set to Enhance Their Value Through Policy–Based Management, Local Networks, Aug. 14, 1995, p. 23.

Goldberg, Michael, Stratus Computer Turns on Radio, A Fault–Tolerant Server, Computer World, Workgroup Computing, Oct. 30, 1995, p. 59.

Kung, H.T. and Morris, Robert, Credit–Based Flow Control for ATM Networks, IEEE Network, Mar./Apr. 1995, p. 40–48.

Lawton, Stephen, Digital Unveils Virtual LAN Architecture, Digital News & Review, Apr. 24, 1995, p. 9–10.

Ramakrishnan, K. K. and Newman, Peter, Integration of Rate and Credit Schemes for ATM Flow Control, IEEE Network, Mar./Apr. 1995, pp. 49–56.

Stankovic, John A., Spuri, Marco, Di Natale, March and Buttazzo, Giorgio C., Implications of Classical Scheduling Results for Real–Time Systems, IEEE Network, Jun. 1995.

Bell Communications, "Generic System Requirements ISO Switched Multi–Megabit Data Service," Bellcore Technical Reference, Issue 1 (May 1991).

IEEE 802.1 Working Group, IEEE 802.1—1995 Document Register (1995).

"Bridges vs. Routers: Comparing Functionality, How are bridges and routers and integrated functionality bridge/routers being used to meet the demands of today's internetworking environment?", Telecommunications, Americas Edition Vo. 27, No. 4 (Apr. 1993).

"Broadband Future Faces Snarls and Gnarls," Business communications Review (Dec. 1993).

Interoffice Memorandum from Ellen Minter regarding Education and Science, "Education and Science: Advancing Knowledge and Innovation," IBU DECWORLD Update (Mar. 3, 1992).

"Crescendo, Kalpma and Alantec, Third party networking add ons for SPARC servers," Sun Microsystems, Inc. (1992).

"Clearpoint Demonstrates Frame Relay Support in Interop Frame Relay Solutions Showcase TIPIIP Support Also Features," Press Release (Sep. 23, 1991).

Digital GIGAswitch/Router User Reference Manual—Part No. 32684-03 (Dec. 1999).

Foundry Networks, Foundry EdgeIron Users Guide—Chapter 21: 802.1Q VLANs (Mar. 2005).

"Scalable Hardware for the Internet Future," Foundry Networks System Architectures (Oct. 11, 1995).

Backes, Floyd, "Spanning Tree Bridges—Transparent Bridges for Interconnection of IEEE 802 LANs", IEEE Network: The Magazine Computer Communications, vol. 2, No. 1, 5–9 (Jan. 1988).

Baker, F., Network Working Group, Point to Point protocol Extensions for Bridging (Apr. 1991).

Braden, R., Internet Engineering Task Force, Requirement for Internet Hosts—Communication Layers (Oct. 1989).

Bradner & Greenfield, "Manageability, not speed, is crucial among routers," PC Magazine (Mar. 30, 1993).

Bunn, J.J., "DECCO Project", Trip Report: DECworld, Boston (May 18, 1992).

Catania, V. et al., "A Routing Strategy for MAN Interconnection", IEEE, pp. 608–615 (1991).

Chen & Chang, "Efficient multicast source routing scheme," Computer Comunications vol. 16, No. 10, 662–666 (1993).

Claffy, et. al., "A Parameterizable Methodology for Internet Traffic Flow Profiling," IEEE Journal on Selected Areas in Communications, vol. 13, No. 8 (Oct. 8, 1995).

Crocetti, P., et al., "Multicast in SMDS over an ATM network" Proc. Globecom '92, vol. 2, 1062–66 (1992).

Emigh, Jacqueline, "Digital runs 200 MHz chip—1st demo of Alpha—Digital Equipment Corporations's (DEC's) Alpha microprocessor," Newsbytes News Network, DEC-World (May 4, 1992).

Eng, Ky, et al., "Multicast and Broadcast Services in a Knockout Packet Switch," MFOCOM '88. Networks: Evolution or Revolution? Proceedings. Seventh Annual Joint Conference of the IEEE Computer and Communications Societies. IEEE, 29–34 (1988).

Foster, Ian, Designing and Building Parallel Programs, (Addison Wesley Nov. 2003).

Grimshaw, Michael, "LAN Interconnections Technologies, Inteconnecting LANs is one thing, but avoiding loops, responding to network failures, and interoperating different LANs is quite another," Telecommunications North American Edition vol. 25, No. 2 (Feb. 1991).

Harris and Jeffreies, Inc., A Proposal for Software Development; Prepared for: Tony Bono (Clearpoint Research Corp.); For an IP–Router Facility (Feb. 19, 1991).

Hawe, Bill, et al., "Transparent Interconnection of Local Area Networks with Bridges," Journal of Telecommunications Networks, vol. 3, No. 2, 116–130.

Jennings, Tate, et al., "Practical SMDS Demonstrations," Proceedings 17th Conference on Local Computer Networks, 300–309 (Sep. 13, 1992).

Kelley, Paul, "Connecting LANs with Bridges, Systems managers have a number of decisions to make when linking LANs together, including just how far a bridge will go and which one to cross," Telecommunications North American Edition, vol. 24, No. 6, article titled (Jun. 1990).

King, Steven, "It's an Adventure (Part 2/3)," Network World, vol. 12, No. 15, Apr. 10, 1995, pp. 49–55.

Kim, Hyong S.; "Multinet Switch: Multistage ATM Switch Architecture with Partially Shared Buffers," IEEE Infocom '93: The Conference on Computer Communications Proceedings vol. (Mar. 28, 1993).

Lidinsky, William, "802.1 Minutes and Document Plan," Presentation at IEEE 802.1 Working Group, West Palm Beach (Mar. 1995).

Lin & Wang, "A Platform for Seamless Interworking Among Conventional LANs and ATM Networks," Global Telecommunications Conference, 1994. Globecom '94. 'Communications: The Global Bridge'., IEEE, vol. 1,291–5.

Marchok, Daniel, et. al., "Multicasting in a Growable Packet (ATM) Switch," Infocom '91. Proceedings. Tenth Annual Joint Conference of the IEEE Computer and Communications Societies. Networking in the 90s. IEEE, vol. 2, 850–858 (Apr. 7, 1991).

McNealis, Martin, "1995—The Year of the Virtual LAN," Presentation at IEEE Conference, Maui (Jul. 1995).

McNealis, Martin, "Virtual LAN Requirements," Presentation at IEEE 802.1 Interim Meeting (Oct. 12, 1995).

Ngoh, L.H., "Multicast support for group communications," Computer Networks and ISDN Systems 22 (1991).

Paliwoda, K., "Transactions involving multicast," Comp. Comm'ns, vol. 11, No. 6, 313–18 (Dec. 1988).

Emigh, J., "DECWorld: DEC Intros High–Speed Networking Gigaswitch"—Product Announcement, Newsbytes News Network, May 7, 1992.

Rajagopalan, Bala, "Reliablity and Scaling Issues in Multicast Communication," Computer Communication Review: Sigcomm '92 Conference Proceedings, Communications Architectuers and Protocols, vol. 22, No. 4 (Aug. 17, 1992).

Rooney, Sean et al.; Computer Communication Review: Automatic VLAN creation based on on–line measurement (Feb. 19, 1991).

Rozenblad, et. al. W., "Interconnection of LANsB02.6 Customer Premises Equipment (CPEs) via SMDS on Top of ATM: a case description," IFIP Transactions, vol. C–14: Proceedings of the FFIP TC61WG6.4 Fourth International Conference on High Performance Networking IV, 43 1–442 (Dec. 14, 1992).

Camarda, et al., P., "A Router for the Interconnection of Ethernet Local Area Network Via An ATM Network".

Cheriton, et al., Host Groups: A Multicast Extension for Datagram Internetworks. Data Communications Symposium, Sep. 1985, pp. 172–179.

Gruchevsky, et al., The Burroughs Integrated Adaptive Routing System. Computer Communications Review, 1987, 17 (1–2):18–34.

Petrosky, M., "Switching Strategy Will be Key as Internet Markets Collide," Network World, 11(8); p. 34, Feb. 21, 1994).

MacAskill, S., "Cableton Preps Modules for MMAC–Plus Hub," Network World, 11, 18; p. 32, May 2, 1994.

Hemmady, J.G., "Metropolitan Area Network Generic Framework System Requirements in Support of Switched Multi–Megabit Data Service," Bellcore Technical Advisory TA–TSY–000772 Bell Communications Research, Part 1, pp. 1–1–12.1, Feb. 1988.

Catalyst 1200 Installation and Configuration Guide, vol. 7, No. 1. 1995.

Cheriton, D.R., "Sirpent: A High–Performance Internetworking Approach," Sigcomm '89 Symposium, Communications Architectures & Protocols, Sep. 19–22, 1989.

Computer History Museum: Where Computing History Lives, Mar. 30, 2006, <http://www.computerhistory.org/>.

Segall, Adrian, et al., "Reliable Multiuser Tree Setup with Local Identifiers," IEEE Journal on Selected Areas in Communications, vol. 9, No. 9 (Dec. 1991).

Shimada, K. Karl, "VLAN Classes," Presentation at IEEE 802.1 Interim Meeting (Oct. 11, 1995).

Shimada, K. Karl, "VLAN Requirements," Presentation at IEEE 802.1 Interim Meeting (Oct. 11, 1995).

Shimada, K. Karl, "VLAN Definition," Presentation at IEEE 802.1 Interim Meeting (Oct. 11, 1995).

Shrimpton, David: Cooper, Christopher; "Multicast communication on the Unison network," Computer Communication: network architecture (1990).

Sincoskie & Cotton, "Extended Bridge Algorithms for Large Networks," IEEE Network: The Magazine of Computer Communications, vol. 2, No. 1 (Jan. 1988).

Souza, et. al. R., "GIGAswitch System: A High–Performance Packet–Switching Platform," Digital Technical Journal, vol. 6 No. 1,9–22 (1994).

Spiegal, E. M., et al., "An Alternate Path Routing Scheme Supporting QOS and Fast Connection Setup in ATM Networks", IEEE, pp. 1224–30 (1994).

Sterbenz, James P.G., et al., Report and Discussion on the IEEE ComSoc TCGN Gigabit Networking Workshop 1995, IEEE Network (Jul. 1995).

Tantawy & Zitterbart, "A Scheme for High–Performance LAN Interconection Across Public MAN'S," IEEE Journal on Selected Areas in Communications, vol. 11, No. 8 (Oct. 1993).

Tantawy & Zitterbart, "A Scheme for Remote LAN Bridging across SMDS MANS," Proc. Globecom '92, vol. 1 (1992).

Tobagi, Fouad A., "Fast packet switch architectures for broadband integrated services digital networks", Proc. IEEE 133–67 (1 990).

Tu & Leung, "Multicast Connection–Oriented Packet Switching Networks," Proc. Of SupperComm Int'l Conference on Comm'ns (1990).

Wakerly, John, "Alantec Intelligent Switching Hubs, Some VLAN Styles," Presentation from the IEEE 802.1 Meeting (Oct. 11, 1995).

Yum & Chen,"Multicast Source Routing in Packet–Switched Networks," IEEE Infocom '91—Networking in the 90s. The Conference on Computer Communications Proceedings vol. 3 (Apr. 7, 1991).

"Virtual LANs Get Real," Data Communications, vol. 24, No. 3, Mar. 1995, pp. 87–100.

Feature: Virtual LAN switch backgone support companies, Network World (Apr. 10, 1995).

IEEE 802 Standards Committee, Instructions to the Editor for the revision of Overview and Architecture, IEEE Doc. P802.1–95/007 (Jul. 12, 1995).

IEEE 802 Standards Committee, Instructions to the Editor for P802, and Ballot Summary, IEEE Doc. P802.1–95/008 (Jul. 12, 1995).

IEEE 802 Standards Committee, "Proposed comments on ISO/IEC 10038PDAM 2," IEEE Doc. P802.1–95/009 (Jul. 12, 1995).

IEEE 802 Standards Committee, "Proposed comments on ISO/IEC 15802–5PDAM 1" IEEE Doc. P802.1–95/010 (Jul. 12, 1995).

IEEE 802 Standards Committee, "802.1 Resolution on progression of VLAN work," IEEE Resolution (Jul. 1995).

IEEE 802.1 Working Group, "IEEE 802.1 Working Group, Minutes of the march 1995 Meeting" (Mar. 1995).

Presentation titled "1995—The Year of the Virtual LAN," IEEE Conference, Maui, Jul. 1995.

de Vries, Rein J.F., "ATM Multicast Connections Using the Gauss Switch," Proc. Globecom '90—Communications: Connecting the Future vol. 1,21 (1990).

Deering, Stephen, "Multicast Routing in Internetworks and Extended LANs,"ACM Press: SIGCOMM '88 Symposium—Communications Architectures & Protocols, vol. 25, No. 1, 88–101 (Aug. 16, 1988).

Greer, Lou, "Would You Believe . . . DECWorld 2001" by Lou Greer (Jun. 25, 2001).

Kaliszewski, J. M., "Routing Algorithm and Route Optimization on SITA Data Transport Network", IEEE, pp. 892–897 (1983).

Lai, Wai Sum, "Packet Forwarding", IEEE Communications Magazine, vol. 26, No. 7), pp. 8–17 (Jul. 1988).

Newman, Peter, "ATM Switching, ATM Local Area Networks, LAN emulation offers a best–effort, connectionless, packet transfer service at the MAC Sublayer, implemented on top of a connection–oriented ATM network," IEEE Communications Magazine (Mar. 1994).

Comer, C.D. Interworking with TCP/IP, vol. 1. Principals, Protocols and Architecture. Prentice Hall, New Jersey, 2nd Edition, Chapter 16, pp. 165–280.

Asoh, et al. Virtual LAN Realization on an ATM Connectionless Public Network. Second Asia Pacific Conference on Communications, Jun. 1995, Japan, vol. 2.

Morency, J. et al., "Virtual LANs Promise Big Gains, Pose New Risks," Network World, May 2, 1994.

Ohteru, Y., "Interconnecting IEEE 802 LANs by a Wideband Backgone Network," IEEE, 1987.

IBM Technical Disclosure Bulletin: Method for Assigning Network Applications to Users and Groups. vol. 37, No. 4b, Apr. 1994.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-39 is confirmed.

* * * * *